United States Patent
Miyata

(10) Patent No.: US 10,042,230 B2
(45) Date of Patent: Aug. 7, 2018

(54) DISPLAY DEVICE SUBSTRATE, DISPLAY DEVICE, ELECTRONIC APPARATUS, CONTROL METHOD FOR DISPLAY DEVICE, AND MANUFACTURING METHOD FOR DISPLAY DEVICE SUBSTRATE

(71) Applicant: Seiko Epson Corporation, Tokyo (JP)

(72) Inventor: Takashi Miyata, Shiojiri (JP)

(73) Assignee: Seiko Epson Corporation (JP)

( * ) Notice: Subject to any disclaimer, the term of this patent is extended or adjusted under 35 U.S.C. 154(b) by 99 days.

(21) Appl. No.: 15/143,853

(22) Filed: May 2, 2016

(65) Prior Publication Data

US 2016/0329012 A1 Nov. 10, 2016

(30) Foreign Application Priority Data

May 7, 2015 (JP) ................................ 2015-094767
May 12, 2015 (JP) ................................ 2015-097112

(51) Int. Cl.
*G09G 5/00* (2006.01)
*G02F 1/167* (2006.01)
(Continued)

(52) U.S. Cl.
CPC ........ *G02F 1/167* (2013.01); *G02F 1/133382* (2013.01); *G09G 3/344* (2013.01);
(Continued)

(58) Field of Classification Search
CPC combination set(s) only.
See application file for complete search history.

(56) References Cited

U.S. PATENT DOCUMENTS

| 2010/0002163 | A1 | 1/2010 | Sekine |
| 2010/0053484 | A1* | 3/2010 | Ono ................. G02F 1/134363 349/37 |

(Continued)

FOREIGN PATENT DOCUMENTS

| JP | 2006-243063 A | 9/2006 |
| JP | 2010-204511 A | 9/2010 |

OTHER PUBLICATIONS

C. Park et al., "Reversal of Temperature Dependence of Integrated Circuits Operating at Very Low Voltages", IEEE International Electron Devices Meeting 1995, pp. 71-74 (Dec. 10, 1995).

(Continued)

*Primary Examiner* — Lixi C Simpson
(74) *Attorney, Agent, or Firm* — Harness, Dickey & Pierce, P.L.C.

(57) ABSTRACT

A display device substrate includes a pixel electrode including a first connection point and a second connection point and for applying a voltage to an electro-optical element, a display gradation of which changes according to application of a voltage, a first signal line, a second signal line, a first transistor configured to control connection of the first signal line and the first connection point, a second transistor configured to control connection of the second signal line and the second connection point, and an output section configured to supply a first driving signal to the first signal line and supply a second driving signal delayed with respect to the first driving signal to the second signal line.

6 Claims, 18 Drawing Sheets

(51) Int. Cl.
*G02F 1/1333* (2006.01)
*G09G 3/34* (2006.01)
(52) U.S. Cl.
CPC . *G02F 2001/1676* (2013.01); *G09G 2230/00* (2013.01); *G09G 2300/0809* (2013.01); *G09G 2310/0291* (2013.01); *G09G 2320/0252* (2013.01); *G09G 2320/041* (2013.01)

(56) References Cited

U.S. PATENT DOCUMENTS

2012/0223921 A1* 9/2012 Ohara .................. G09G 3/3651
  345/204
2013/0176613 A1* 7/2013 Yamada .................. G02F 1/167
  359/296

OTHER PUBLICATIONS

Extended European Search Report for Patent Application No. EP16168332.1, dated Jun. 24, 2016 (13 pages).

* cited by examiner

DISPLAY DEVICE SUBSTRATE, DISPLAY DEVICE, ELECTRONIC APPARATUS, CONTROL METHOD FOR DISPLAY DEVICE, AND MANUFACTURING METHOD FOR DISPLAY DEVICE SUBSTRATE

This application claims priority to Japanese Patent Application No. 2015-094767 filed on May 7, 2015 and Japanese Patent Application No. 2015-097112 filed on May 12, 2015 which are hereby expressly incorporated by reference in its entirety.

BACKGROUND

1. Technical Field

Several aspects of the present invention relate to a technique for driving an electro-optical element.

2. Related Art

In a display device including an electro-optical element such as an electrophoretic element or a liquid crystal element, responsiveness of the electro-optical element decreases and display performance is deteriorated under a low-temperature environment (e.g., display switching speed decreases). JP-A-2010-204511 (Patent Literature 1) discloses a configuration for, when detecting a drop of an environmental temperature with a temperature sensor, feeding an electric current to a pixel electrode and generating heat to heat an electrophoretic element. Specifically, a voltage Vd is supplied to one end of the pixel electrode via a data line and a voltage Vh different from the voltage Vd is supplied to the other end of the pixel electrode via a heater line to cause a potential difference between both the ends of the pixel electrode to feed an electric current.

However, in the technique of Patent Literature 1, the voltage Vd for display supplied to the data line and the voltage Vh for heating of the electro-optical element need to be separately generated. Therefore, a configuration for generating a voltage used in a display device (e.g., the configuration of a power supply circuit) is complicated. In the technique of Patent Literature 1, the configuration of the display device is complicated because of setting of a temperature sensor.

SUMMARY

An advantage of some aspects of the invention is to make it possible to improve a display characteristic without complicating a device configuration and a manufacturing process.

A display device substrate according to a preferred aspect of the invention includes: a pixel electrode including a first connection point and a second connection point and for applying a voltage to an electro-optical element, a display gradation of which changes according to application of a voltage; a first signal line; a second signal line; a first transistor configured to control connection of the first signal line and the first connection point; a second transistor configured to control connection of the second signal line and the second connection point; and an output section configured to supply a first driving signal to the first signal line and supply a second driving signal delayed with respect to the first driving signal to the second signal line. In the above configuration, the second driving signal supplied from the second signal line to the second connection point via the second transistor is delayed with respect to the first driving signal supplied from the first signal line to the first connection point via the first transistor. Therefore, a potential difference occurs between the first connection point and the second connection point for a delay time after a voltage of the first driving signal fluctuates. An electric current corresponding to the potential difference flows. Consequently, the pixel electrode generates heat. The electro-optical element is heated by the heat generation of the pixel electrode for applying a voltage to the electro-optical element. Therefore, compared with a configuration in which a heating wire or the like exclusively used for heating of the electro-optical element is set, it is possible to heat the electro-optical element while suppressing complication of a device configuration. Since the second driving signal is delayed with respect to the first driving signal, compared with the configuration of Patent Literature 1 for generating separate voltages different from each other and applying the voltages between both the ends of the pixel electrode, there is also an advantage that the configuration for generating a voltage applied to the pixel electrode is simplified.

In the display device substrate according to the preferred aspect of the invention, the display device substrate may further include a scanning line connected to a gate of the first transistor and a gate of the second transistor, and the first transistor and the second transistor may be controlled to an ON state according to supply of a selection voltage to the scanning line. In the above configuration, the gate of the first transistor and the gate of the second transistor are connected to the common scanning line and controlled in the same manner. Therefore, compared with a configuration for controlling the first transistor and the second transistor with separate wires or signals, there is an advantage that the configuration and the control are simplified.

In the display device substrate according to the preferred aspect of the invention, the output section may include a delay circuit that generates the second driving signal and outputs the second driving signal to the second signal line, and the delay circuit may include a transistor having a characteristic that a drain current decreases as an environmental temperature is lower. In the above configuration, the drain current of the transistor included in the delay circuit, which generates the second driving signal, decreases as the environmental temperature is lower. Therefore, a delay amount of the second driving signal due to the delay circuit increases as the environmental temperature is lower. As the delay amount of the second driving signal is larger, the length of time in which an electric current flows to the pixel electrode increases and, as a result, the heating of the electro-optical element by the heat generation of the pixel electrode is facilitated. As it is understood from the above explanation, the heating of the electro-optical element corresponding to the environmental temperature (an operation for heating the electro-optical element more as the environmental temperature is lower) is realized without requiring a temperature sensor that detects the environmental temperature.

The display device substrate according to the preferred aspect of the invention is manufactured by, for example, methods according to a first aspect and a second aspect exemplified below. The manufacturing method according to the first aspect is a manufacturing method for a display device substrate of a display device including an electro-optical element, a display gradation of which changes according to application of a voltage, the manufacturing method for the display device substrate including: forming a pixel section on a substrate; forming an insulating layer covering the pixel section; and forming a pixel electrode including a first connection point and a second connection point electrically connected to the pixel section via a conduction hole of the insulating layer. The forming the pixel section includes forming the pixel section including a first signal line and a second signal line, a first transistor configured to control connection of the first signal line and the first connection point, a second transistor configured to control connection of the second signal line and the second connection point, and an output section configured to supply a first driving signal to the first signal line and supply a second driving signal delayed with respect to the first driving signal to the second signal line. In the manufacturing method according to the second aspect, the forming the pixel electrode includes forming a transistor included in the output section in a process common to the first transistor and the second transistor.

A display device according to another preferred aspect of the invention includes: an electro-optical element, a display gradation of which changes according to application of a voltage; a pixel electrode including a first connection point and a second connection point; an opposite electrode configured to apply a voltage to the electro-optical element between the opposite electrode and the pixel electrode; a first signal line; a second signal line; a first transistor configured to control connection of the first signal line and the first connection point; a second transistor configured to control connection of the second signal line and the second connection point; and an output section configured to supply a first driving signal to the first signal line and supply a second driving signal delayed with respect to the first driving signal to the second signal line.

The display device according to the preferred aspect of the invention is controlled by a control method according to a preferred aspect of the invention exemplified below. The control method according to the preferred aspect of the invention is a control method for a display device including a pixel electrode including a first connection point and a second connection point and for applying a voltage to an electro-optical element, a display gradation of which changes according to application of a voltage, a first signal line, a second signal line, a first transistor configured to control connection of the first signal line and the first connection point, and a second transistor configured to control connection of the second signal line and the second connection point, the control method including supplying a first driving signal to the first signal line and supplying a second driving signal delayed with respect to the first driving signal to the second signal line in a state in which the first transistor and the second transistor are turned on.

A display device according to still another preferred aspect of the invention includes: an electro-optical element, a display gradation of which changes according to application of a voltage; a pixel electrode for applying a voltage to the electro-optical element; an opposite electrode including a first connection point and a second connection point and configured to apply a voltage to the electro-optical element between the opposite electrode and the pixel electrode; and an output section configured to supply a first driving signal to the first connection point and supply a second driving signal delayed with respect to the first driving signal to the second connection point. In the above configuration, the second driving signal supplied to the second connection point is delayed with respect to the first driving signal supplied to the first connection point. Therefore, a potential difference occurs between the first connection point and the second connection point for a delay time after a voltage of the first driving signal fluctuates. An electric current corresponding to the potential difference flows. Consequently, the opposite electrode generates heat. The electro-optical element is heated by the heat generation of the opposite electrode for applying a voltage to the electro-optical element. Therefore, compared with a configuration in which a heating wire or the like exclusively used for heating of the electro-optical element is set, it is possible to heat the electro-optical element while suppressing complication of a device configuration. Since the second driving signal is delayed with respect to the first driving signal, compared with the configuration of Patent Literature 1 for separately generating a voltage for display and a voltage for heating of the electro-optical element, there is also an advantage that an element for generating a voltage supplied to the opposite electrode is simplified.

In the display device according to the preferred aspect of the invention, the output section may include a delay circuit configured to generate the second driving signal and output the second driving signal to the second connection point, and the delay circuit may include a transistor having a characteristic that a drain current decreases as an environmental temperature is lower. In the above configuration, the drain current of the transistor included in the delay circuit, which generates the second driving signal, decreases as the environmental temperature is lower. Therefore, a delay amount of the second driving signal due to the delay circuit increases as the environmental temperature is lower. As the delay amount of the second driving signal is larger, the length of time in which an electric current flows to the opposite electrode increases and, as a result, the heating of the electro-optical element is facilitated by the heat generation of the opposite electrode. As it is understood from the above explanation, the heating of the electro-optical element corresponding to the environmental temperature (an operation for heating the electro-optical element more as the environmental temperature is lower) is realized without requiring a temperature sensor that detects the environmental temperature.

In the display device according to the preferred aspect of the invention, the delay circuit may be set on a first substrate on which a signal line to which a gradation signal of a voltage corresponding to a designated gradation is supplied, the pixel electrode, and a transistor that controls connection of the signal line and the pixel electrode are set, and the opposite electrode may be set on a second substrate, between which and the first substrate the electro-optical element is disposed. In the above configuration, the delay circuit is formed on the first substrate on which the transistor that controls the connection of the pixel electrode and the signal line is formed. Therefore, compared with a configuration in which the transistor of the delay circuit is set on the second substrate, an effect that the configuration of the elements on the second substrate is simplified is realized.

In the display device according to the preferred aspect of the invention, the opposite electrode may include a first common wiring section including the first connection point, a second common wiring section formed to be spaced apart from the first common wiring section and including the second connection point, and a plurality of electrode sections extending between the first common wiring section and the second common wiring section. In the above configuration, a potential difference occurs between the first common wiring section including the first connection point and the second common wiring section including the second connection point and an electric current corresponding to the potential difference flows to the plurality of electrode sections extending between the first common wiring section and the second common wiring section, whereby the opposite electrode is heated. Since the electric current flows to the plurality of electrode sections extending from the first common wiring section and the second common wiring section, it is possible to secure the resistance of the electrode sections and efficiently heat the electro-optical element.

The display device according to the preferred aspect of the invention is manufactured by, for example, a method according to a preferred aspect of the invention exemplified below. The manufacturing method according to the preferred aspect of the invention is a manufacturing method for a display device including an electro-optical element, a display gradation of which changes according to application of a voltage, the manufacturing method for the display device including: forming a pixel section on a first substrate; forming an insulating layer covering the pixel section; forming a pixel electrode electrically connected to the pixel section via a conduction hole of the insulating layer; and disposing the electro-optical element between the first substrate and a second substrate on which an opposite electrode including a first connection point and a second connection point and configured to apply a voltage to the electro-optical element between the opposite electrode and the pixel electrode is formed. The forming the pixel section includes forming the pixel section including an output section configured to supply a first driving signal to the first connection point and supply a second driving signal delayed with respect to the first driving signal to the second connection point.

A display device according to still another preferred aspect of the invention is controlled by a control method according to a preferred aspect of the invention exemplified below. The control method according to the preferred aspect of the invention is a control method for a display device including an electro-optical element, a display gradation of which changes according to application of a voltage, a pixel electrode for applying a voltage to the electro-optical element, and an opposite electrode including a first connection point and a second connection point and configured to apply a voltage to the electro-optical element between the opposite electrode and the pixel electrode, the control method including supplying a first driving signal to the first connection point and supplying a second driving signal delayed with respect to the first driving signal to the second connection point.

Besides the display device substrate and the display device, aspects of the invention can also be conceived as an electronic apparatus including the display device. As the electronic apparatus according to the invention, an electronic book, a timepiece (a clock system or a wristwatch), a portable terminal, and the like can be exemplified. However, an application range of the invention is not limited to the examples.

BRIEF DESCRIPTION OF THE DRAWINGS

The invention will be described with reference to the accompanying drawings, wherein like numbers reference like elements.

DESCRIPTION OF EXEMPLARY EMBODIMENTS

First Embodiment

Figure 1:
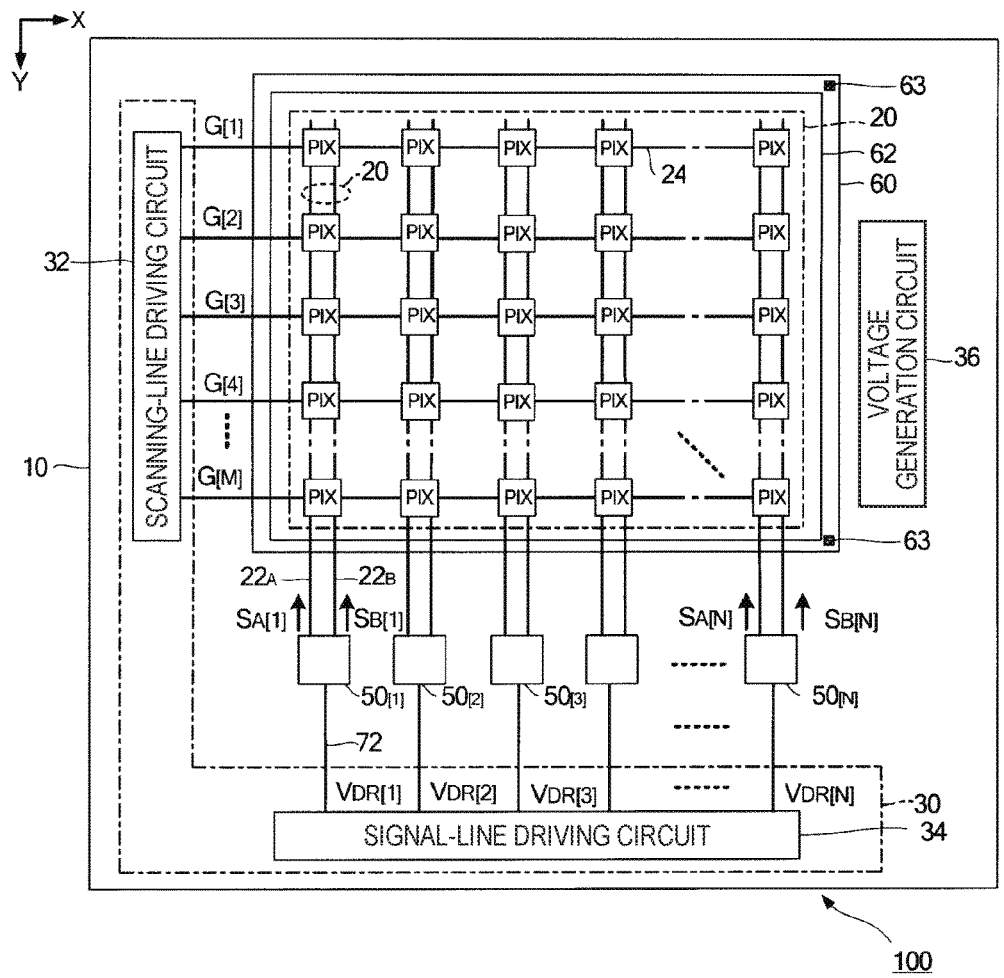
FIG. 1 is a configuration diagram of a display device according to an embodiment of the invention.

FIG. 1 is a block diagram of a display device 100 according to a preferred embodiment of the invention. The display device 100 is an electro-optical device including an electrophoretic element, a display gradation of which changes according to application of a voltage. The display device 100 includes an element substrate 10 and an opposite substrate 60 opposed to each other. The opposite substrate 60 is located on an observation side (a side of an observer who visually recognizes a display image displayed by the display device 100) viewed from the element substrate 10. The element substrate 10 and the opposite substrate 60 are joined by a seal material (not shown in the figure) at a predetermined interval. The electrophoretic element is sealed in a gap between both the substrates.

On a surface of the element substrate 10 opposed to the opposite substrate 60, as illustrated in FIG. 1, a pixel section 20 including a plurality of pixel circuits PIX, a driving circuit 30 that drives the pixel circuits PIX, a voltage generation circuit 36, and a plurality of (N) output sections 50[1] to 50[N] are set. On the other hand, the opposite substrate 60 is a light-transmitting substrate of glass, quartz, or the like. An opposite electrode 62 is formed on the surface opposed to the element substrate 10. The opposite electrode 62 is a light-transmitting conductive layer of ITO (Indium Tin Oxide) or the like and is continuous over the plurality of pixel circuits PIX in plan view.

The voltage generation circuit 36 generates a voltage VH and a voltage VL. The voltage VH is higher than the voltage VL (VH>VL). The voltage VH is set to, for example, 10 V to 15 V. The voltage VL is set to, for example, 0V. The voltage VH and the voltage VL generated by the voltage generation circuit 36 are supplied to the driving circuit 30. The voltage generation circuit 36 generates and outputs a common voltage VCOM set to the voltage VH or the voltage VL. The common voltage VCOM generated by the voltage generation circuit 36 is supplied to the opposite electrode 62 via a conduction section 63 (a so-called silver point) formed between the element substrate 10 and the opposite substrate 60.

The pixel section 20 includes M scanning lines 24 extending in an X direction and N sets of signal line pairs extending in a Y direction crossing the X direction (typically, orthogonal to the X direction) (M and N are natural numbers). The signal line pair 22 includes a first signal line 22A and a second signal line 22B extending in the Y direction at an interval from each other. The plurality of pixel circuits PIX are disposed to correspond to crossings of the scanning lines 24 and the signal line pairs 22 and arrayed in a matrix shape of M rows and N columns.

Figure 2:
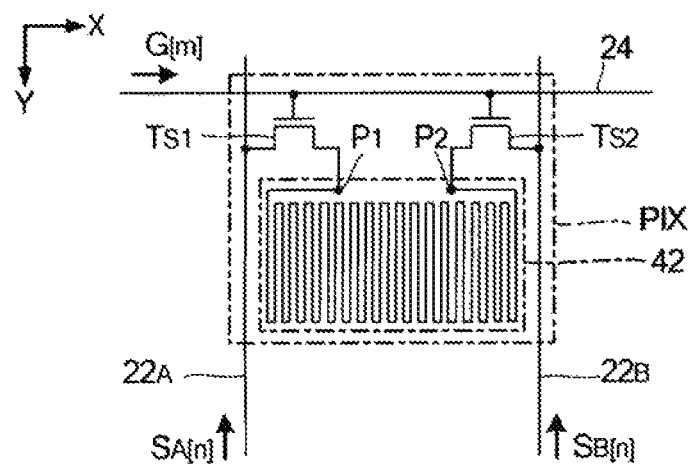
FIG. 2 is a circuit diagram of a pixel circuit.

FIG. 2 is a circuit diagram of the pixel circuit PIX. In FIG. 2, any one pixel circuit PIX located in an m-th row and an n-th column is shown. The pixel circuit PIX includes a pixel electrode 42, a first transistor TS1, and a second transistor TS2. The pixel electrode 42 is an electrode for applying a voltage to an electrophoretic element 46 and includes a first connection point P1 and a second connection point P2. The first transistor TS1 functions as a switching element that controls electric connection (conduction/non-conduction) of the first signal line 22A and the first connection point P1 of the pixel electrode 42. The second transistor TS2 functions as a switching element that controls electric connection of the second signal line 22B and the second connection point P2 of the pixel electrode 42. The first transistor TS1 and the second transistor TS2 are thin-film transistors of an N-channel type. Gates of the first transistor TS1 and the second transistor TS2 are connected to a common scanning line 24.

In a state in which a voltage V1 at the first connection point P1 and a voltage V2 at the second connection point P2 are differentiated, an electric current corresponding to a voltage difference between the voltage V1 and the voltage V2 flows between the first connection point P1 and the second connection point P2 and the pixel electrode 42 generates heat. In this embodiment, the electrophoretic element 46 is heated by the heat generation of the pixel electrode 42. That is, the pixel electrode 42 in this embodiment also functions as a heating wire for heating the electrophoretic element 46 in addition to the original function of an electrode for applying a voltage to the electrophoretic element 46. To efficiently generate heat for the heating of the electrophoretic element 46, the pixel electrode 42 in this embodiment is formed in a high-resistance shape recursively bent on a positive side and a negative side in the Y direction between the first connection point P1 and the second connection point P2 as illustrated in FIG. 2.

Figure 3:
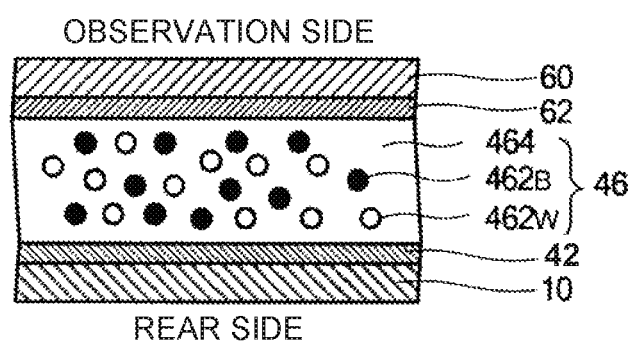
FIG. 3 is an explanatory diagram of driving of an electrophoretic element.

FIG. 3 is an explanatory diagram of the electrophoretic element 46. The electrophoretic element 46 is an electro-optical element representing a gradation using electrophoresis of charged particles 462. The electrophoretic element 46 is disposed between the pixel electrode 42 and the opposite electrode 62 opposed to each other. The electrophoretic element 46 includes white charged particles 462W and black charged particles 462B charged in opposite polarities each other and a dispersion medium 464 in which the charged particles 462 (462B and 462W) are dispersed to be capable of migrating.

The driving circuit 30 shown in FIG. 1 includes a scanning-line driving circuit 32 and a signal-line driving circuit 34. The scanning-line driving circuit 32 and the signal-line driving circuit 34 are mounted on the element substrate 10, for example, in a form of IC chips. The voltage VH and the voltage VL generated by the voltage generation circuit 36 are supplied to the scanning-line driving circuit 32 and the signal-line driving circuit 34. Besides, various control signals such as a synchronization signal and an image signal designating a display gradation are supplied to the scanning-line driving circuit 32 and the signal-line driving circuit 34 from a host apparatus on the outside.

Figure 4:
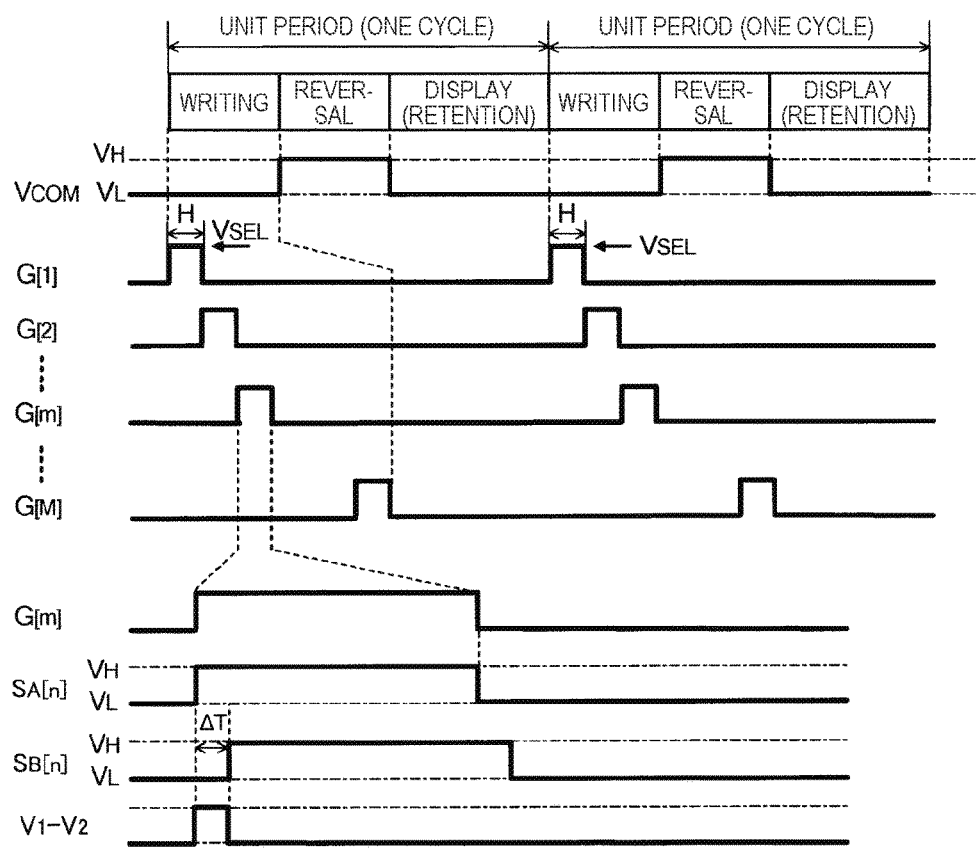
FIG. 4 is a timing chart showing the operation of the display device.

FIG. 4 is a timing chart of the operation of the display device 100. Each unit period (one frame) set as a cycle of the operation of the display device 100 includes a writing period, a reversal period, and a display period. In the writing period, a writing operation for supplying a voltage corresponding to a designated gradation of the pixel circuit PIX to the pixel circuits PIX is executed. In the reversal period, a change in a voltage of the pixel electrodes 42 in the writing period is actually reflected on a display gradation of pixels. In the display period, the display gradation of the pixels is maintained.

As illustrated in FIG. 4, in the writing period of each unit period, the scanning-line driving circuit 32 sequentially selects each of the M scanning lines 24 from the first row to the M-th row in every horizontal scanning period H according to outputs of scanning signals G[1] to G[M]. Specifically, a scanning signal G[m] supplied to the scanning line 24 in the m-th row (m=1 to M) is set to a predetermined selection voltage VSEL, whereby the scanning line 24 in the m-th row is selected.

The signal-line driving circuit 34 supplies, in parallel, driving signals VDR[1] to VDR[N] to N wires 72 corresponding to the signal line pairs 22 different from one another. A driving signal VDR[n] supplied to the wire 72 in the n-th column (n=1 to N) when the scanning line 24 in the m-th row is selected is set to a voltage (a logical level of high/low) corresponding to a gradation designated in the pixel circuit PIX located in the n-th column of the m-th row.

As illustrated in FIG. 1, the N output sections 50[1] to 50[N] corresponding to the signal line pairs 22 different from each other are set on the element substrate 10. The output section 50[n] in the n-th column is set between the wire 72 in the n-th column and the signal line pair 22 in the n-th column. The output section 50[*n*] supplies a first driving signal SA[n] corresponding to the driving signal VDR[n], which is supplied from the signal-line driving circuit 34 to the wire 72 in the n-th column, to the first signal line 22A of the signal line pair 22 in the n-th column and supplies a second driving signal SB[n] corresponding to the driving signal VDR[n] to the second signal line 22B of the signal line pair 22 in the n-th column.

When the scanning-line driving circuit 32 sets the scanning signal G[m] to the selection voltage VSEL in the m-th horizontal scanning period H in the writing period to select the scanning line 24 in the m-th row, the first transistors TS1 and the second transistors TS2 of the pixel circuits PIX in the m-th row are controlled to an ON state. When the first transistors TS1 transition to the ON state, the voltage V1 at the first connection point P1 of the pixel electrode 42 changes to a voltage of the first driving signal SA[n] output to the first signal line 22A by the output section 50[*n*]. The voltage V2 at the second connection point P2 of the pixel electrode 42 changes to a voltage of the second driving signal SB[n] output to the second signal line 22B by the output section 50[*n*]. Each of the first driving signal SA[n] and the second driving signal SB[n] is set to the voltage VH or the voltage VL according to a designated gradation. Therefore, the voltage VH or the voltage VL is applied to the pixel electrode 42.

On the other hand, the common voltage VCOM supplied to the opposite electrode 62 by the voltage generation circuit 36 is also set to the voltage VH or the voltage VL. As it is grasped from the above explanation, ranges of voltages of the first driving signal SA[n] and the second driving signal SB[n] and the common voltage VCOM coincide with each other. As illustrated in FIG. 4, the common voltage VCOM of the opposite electrode 62 is maintained at the voltage VL in the writing period and the display period and is set to the voltage VH in the reversal period.

FIGS. 5A to 5D are explanatory diagrams of display gradations in the periods in the unit period. In FIGS. 5A to 5D, for convenience, an example is shown in which the black charged particles 462B are charged to a positive polarity and the white charged particles 462W are charged to a negative polarity. Attention is directed to changes in a display gradation of the pixel A corresponding to any one pixel electrode 42 and a display gradation of the pixel B corresponding to another pixel electrode 42.

Figure 5A:
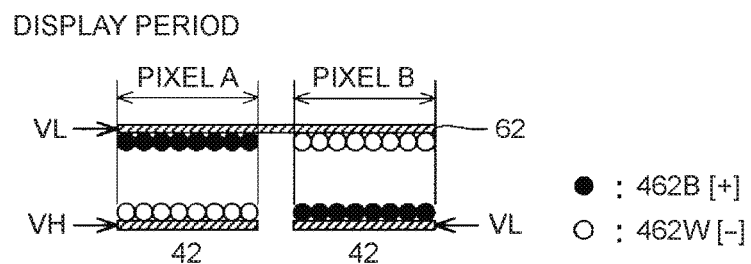
FIGS. 5A to 5D are specific explanatory diagrams of a writing period, a reversal period, and a display period.

First, in the display period, as illustrated in FIG. 5A, it is assumed that the voltage VL is applied to the opposite electrode 62, the voltage VH is applied to the pixel electrode 42 of the pixel A, and the voltage VL is applied to the pixel electrode 42 of the pixel B. In the pixel A, the black charged particles 462B charged in the positive polarity are located on the opposite electrode 62 side and the white charged particles 462W charged in the negative polarity are located on the pixel electrode 42 side. Therefore, the pixel A displays a black gradation. On the other hand, in the pixel B, contrary to the pixel A, the white charged particles 462W are located on the opposite electrode 62 side and the black charged particles 462B are located on the pixel electrode 42 side. That is, the pixel B displays a white gradation.

Figure 5B:
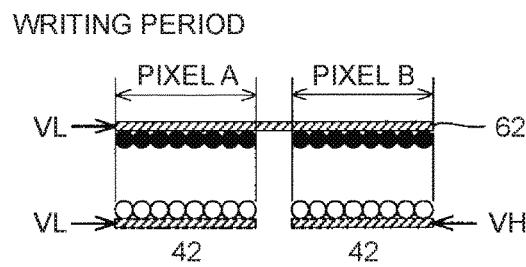

In the writing period, as illustrated in FIG. 5B, it is assumed that the pixel electrode 42 of the pixel A transitions from the voltage VH to the voltage VL and the pixel electrode 42 of the pixel B transitions from the voltage VL to the voltage VH. In the writing period, since the opposite electrode 62 is maintained at the voltage VL, in the pixel B, the black charged particles 462B move to the opposite electrode 62 side and the white charged particles 462W move to the pixel electrode 42 side. That is, the pixel B reverses from the white gradation in the immediately preceding display period to the black gradation. On the other hand, in the pixel A, since both of the opposite electrode 62 and the pixel electrode 42 have the voltage VL, a state of the charged particles 462 (462B and 462W) does not change from the immediately preceding display period. That is, the pixel A is continuously maintained in the black gradation from the immediately preceding display period.

Figure 5C:
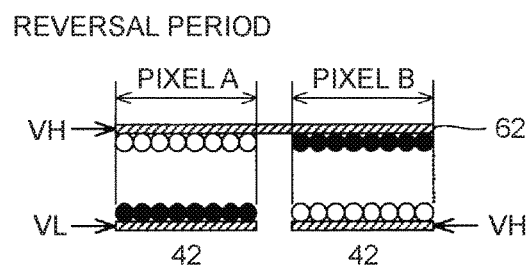
Figure 5D:
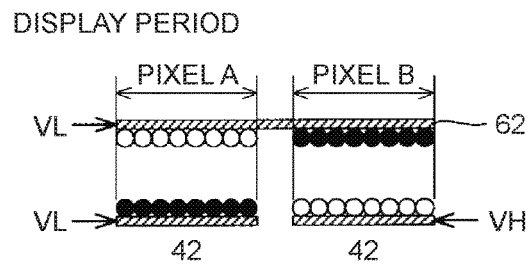

In the immediately following reversal period, as illustrated in FIG. 5C, the opposite electrode 62 transitions from the voltage VL to the voltage VH. Since the pixel electrode 42 of the pixel A is maintained at the voltage VL, the black charged particles 462B move to the pixel electrode 42 side and the white charged particles 462W move to the opposite electrode 62 side. That is, the pixel A is reversed from the black gradation to the white gradation. On the other hand, the pixel B is continuously maintained in the black gradation from the display period. As illustrated in FIG. 5D, in the display period immediately after the opposite electrode 62 transitions from the voltage VH to the voltage VL, the pixel A is maintained in the white gradation and the pixel B is maintained in the black gradation. As it is understood from the above explanation, a change in the voltages of the pixel electrodes 42 in the writing period is actually reflected on the display gradations of the pixels according to the reversal of the common voltage VCOM in the reversal period.

The heating of the electrophoretic element 46 by the heat generation of the pixel electrode 42 is explained. As it is understood from FIG. 4, the output section 50[*n*] in this embodiment delays the second driving signal SB[n] with respect to the first driving signal SA[n] and supplies the second driving signal SB[n] to the second signal line 22B. Specifically, the output section 50[*n*] supplies the first driving signal SA[n], which is set to the voltage VH or the voltage VL according to the driving signal VDR[n] output from the signal-line driving circuit 34 to a wire 72[*n*] in the n-th column, to the first signal line 22A of the signal line pair 22 in the n-th column and supplies the second driving signal SB[n] of the voltage VH or the voltage VL delayed with respect to the first driving signal SA[n] to the second signal line 22B of the signal line pair 22 in the n-th column. That is, in a state in which the first transistor TS1 and the second transistor TS2 are on, the first driving signal SA[n] is supplied to the first signal line 22A and the second driving signal SB[n] delayed with respect to the first driving signal SA[n] is supplied to the second signal line 22B. In FIG. 4, the first driving signal SA[n] and the second driving signal SB[n] are set to the voltage VH when the scanning line 24 in the m-th row is selected. As it is understood from FIGS. 5A to 5D, the pixel in which the voltage VH is applied to the pixel electrode 42 according to the supply of the first driving signal SA[n] and the second driving signal SB[n] displays the black gradation.

As illustrated in FIG. 4, when the scanning line 24 in the m-th row is selected, the voltage VH of the first driving signal SA[n] is supplied from the first signal line 22A to the first connection point P1 of the pixel electrode 42. From a point in time delayed with respect to the first driving signal SA[n] by a delay time ΔT, the voltage VH of the second driving signal SB[n] is supplied from the second signal line 22B to the second connection point P2 of the pixel electrode 42. That is, in a period for the delay time ΔT, the voltage VH is applied to the first connection point P1 and the voltage VL is applied to the second connection point P2. A voltage difference occurs between both the points. Therefore, an electric current corresponding to the voltage difference (V1−V2) between the first connection point P1 and the second connection point P2 flows in the pixel electrode 42. As a result, Joule heat corresponding to electric resistance is generated in the pixel electrode 42 and the electrophoretic element 46 is heated. As it is understood from the above explanation, as the delay time ΔT is longer, the length of time in which the electric current flows to the pixel electrode 42 increases and the heating of the electrophoretic element 46 is facilitated.

Figure 6:
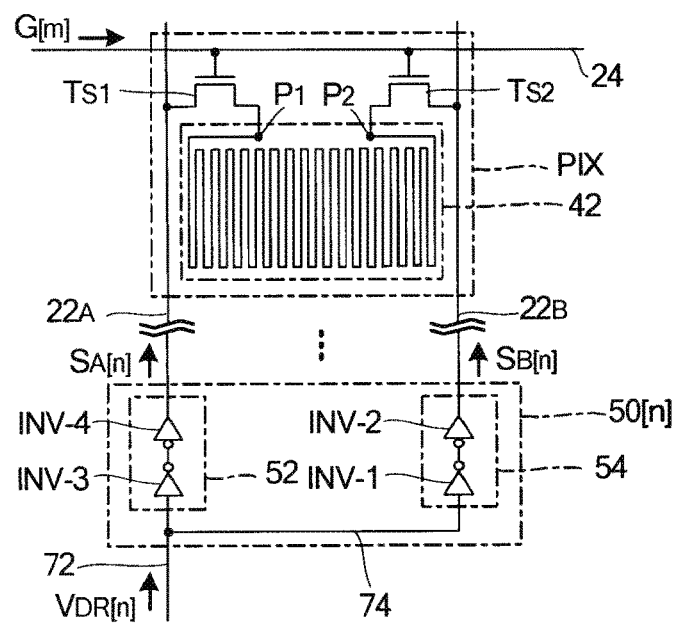
FIG. 6 is a configuration diagram of an output section in the embodiment.

FIG. 6 is an explanatory diagram of the output section 50[n] in this embodiment. The output section 50[n] includes a voltage control circuit 52 and a voltage control circuit 54 as illustrated in FIG. 6. The voltage control circuit 52 is a level shifter that adjusts (expands) the voltage amplitude of the driving signal VDR[n] output from the signal-line driving circuit 34 to the wire 72 to generate the first driving signal SA[n] of the voltage VH or the voltage VL and outputs the first driving signal SA[n] to the first signal line 22A. For example, as illustrated in FIG. 6, the voltage control circuit 52 is configured by connecting an inverter circuit INV-3 and an inverter circuit INV-4 in two stages.

The voltage control circuit 54 is a level shifter that adjusts the voltage amplitude of the driving signal VDR[n] output from the signal-line driving circuit 34 to a wire 74 branching from the wire 72 to generate the second driving signal SB[n] of the voltage VH or the voltage VL and outputs the second driving signal SB[n] to the second signal line 22B. Like the voltage control circuit 52, the voltage control circuit 54 is configured by connecting an inverter circuit INV-1 and an inverter circuit INV-2 in two stages.

Figure 7:
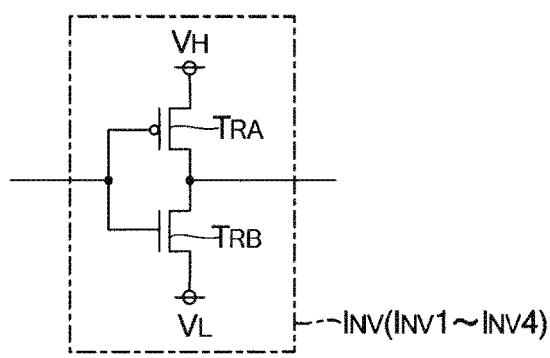
FIG. 7 is a configuration diagram of an inverter circuit.

FIG. 7 is a configuration diagram of the inverter circuit INV. The inverter circuits INV (INV-1 to INV-4) have a common configuration. Therefore, the inverter circuits INV (INV-1 to INV-4) are explained as the inverter circuit INV (INV-1 to INV-4) with reference to FIG. 7. As illustrated in FIG. 7, the inverter circuit INV includes a transistor TRA of a P-channel type and a transistor TRB of an N-channel type interposed in series between the voltage VH on a high potential side and the voltage VL on a low potential side. A common input signal is supplied to gates of the transistor TRA and the transistor TRB. The transistor TRA and the transistor TRB are thin-film transistors collectively formed on the surface of the element substrate 10 in a process same as the process for forming the first transistor TS1 and the second transistor TS2 of the pixel section 20.

Channel width W of the transistor TRA and the transistor TRB of the inverter circuit INV-2 (the voltage control circuit 54) is larger than the channel width W of the transistor TRA and the transistor TRB of the inverter circuit INV-4 (the voltage control circuit 52). For example, when the channel width W of the transistor TRA and the transistor TRB of the inverter circuit INV-4 is set to 10 μm, the channel width W of the transistor TRA and the transistor TRB of the inverter circuit INV-2 is approximately 100 μm (i.e., approximately ten times). With the configuration explained above, a gate capacity (and a time constant) of the transistor TRA and the transistor TRB of the inverter circuit INV-2 is large compared with a gate capacity of the transistor TRA and the transistor TRB of the inverter circuit INV (INV-1, INV-3, and INV-4). Therefore, it is possible to delay the second driving signal SB[n] with respect to the first driving signal SA[n]. That is, the voltage control circuit 54 functions as a delay circuit that generates the second driving signal SB[n] delayed with respect to the first driving signal SA[n] by the delay time ΔT shown in FIG. 4.

Note that channel length L of the transistor TRA and the transistor TRB of the inverter circuit INV-2 (the voltage control circuit 54) may be set equal to the channel length L of the transistor TRA and the transistor TRB of the inverter circuit INV (INV-1, INV-3, and INV-4). In the inverter circuit INV-1 of the voltage control circuit 54, the channel length L and the channel width W of the transistor TRA and the transistor TRB may be set equal to the channel length L and the channel width W of the inverter circuit INV-3 and the inverter circuit INV-4 (the voltage control circuit 52).

Figure 8:
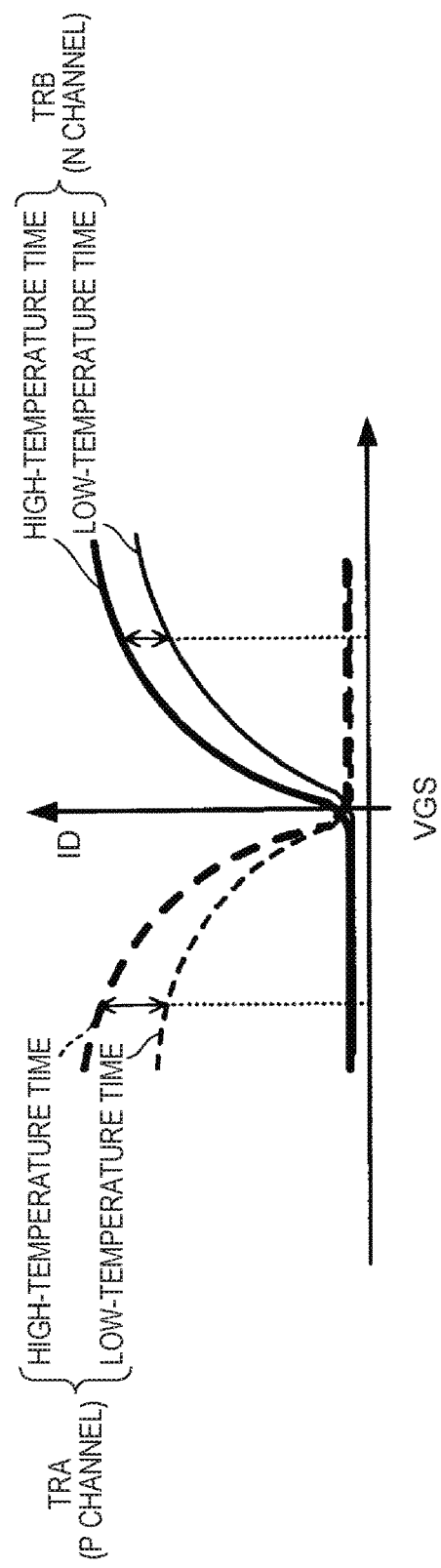
FIG. 8 is a graph showing a relation between an environmental temperature and transistors of an inverter circuit.

FIG. 8 a graph showing voltage-current characteristics (relations between a voltage VGS between a gate and a source and a drain current ID) of the transistor TRA and the transistor TRB of the inverter circuit INV-2 (the voltage control circuit 54). The voltage-current characteristic of the transistor TRB of the N-channel type is indicated by a solid line. The voltage-current characteristic of the transistor TRA of the P-channel type is indicated by a broken line. The voltage-current characteristics at both the times when temperature at which the display device 100 is used (hereinafter referred to as "environmental temperature") is high and low are shown in the figure.

As it is understood from FIG. 8, the drain current ID with respect to a predetermined gate voltage VGS in the transistor TRA and the transistor TRB decreases as the environmental temperature is lower. The delay time ΔT of the second driving signal SB[n] with respect to the first driving signal SA[n] increases as the environmental temperature drops and the drain current ID decreases. Therefore, the heating of the electrophoretic element 46 is facilitated.

As explained above, in this embodiment, the second driving signal SB[n] supplied from the second signal line 22B to the second connection point P2 via the transistor TS2 is delayed with respect to the first driving signal SA[n] supplied from the first signal line 22A to the first connection point P1 via the first transistor TS1. Therefore, for the delay time Δ after the first connection point P1 fluctuates to the voltage V1 of the first driving signal SA[n], a voltage difference occurs (V1−V2) between the first connection point P1 and the second connection point P2 and an electric current corresponding to the voltage difference flows, whereby the pixel electrode 42 generates heat. That is, in this embodiment, the electrophoretic element 46 is heated by the heat generation of the pixel electrode 42 for applying a voltage to the electrophoretic element 46. Therefore, when compared with a configuration in which a heating wire or the like exclusively used for the heating of the electrophoretic element 46 is set, it is possible to heat the electrophoretic element 46 while suppressing complication of a device configuration. Since the second driving signal SB[n] is delayed with respect to the first driving signal SA[n], compared with the configuration of Patent Literature 1 for generating separate voltages different from each other and applying the voltages between both the ends of the pixel electrode 42, there is also an advantage that a configuration for generating a voltage applied to the pixel electrode 42 is simplified.

In this embodiment, the gate of the first transistor TS1 and the gate of the second transistor TS2 are connected to the common scanning line 24. Therefore, compared with a configuration in which the first transistor TS1 and the second transistor TS2 are connected to separate wires and separate signals are supplied to the first transistor TS1 and the second transistor TS2 to control the first transistor TS1 and the second transistor TS2, it is possible to simplify the configuration and the control.

As explained above, the response characteristic of the electrophoretic element 46 changes according to the environmental temperature. Specifically, there is a tendency that, as the environmental temperature is lower, the response characteristic of the electrophoretic element 46 is deteriorated and the display performance is easily deteriorated. In this embodiment, the voltage control circuit 54 includes the transistor TRA and the transistor TRB having a characteristic that a current amount of the drain current ID with respect to the voltage VGS between the gate and the source decreases as the environmental temperature is lower. In the configuration explained above, as the environmental temperature is lower, a delay amount of the second driving signal SB[n] increases and the length of time ΔT in which an electric current flows to the pixel electrode 42 increases. As a result, the heating of the electrophoretic element 46 by the heat generation of the pixel electrode 42 is facilitated. With the configuration explained above, the heating of the electrophoretic element 46 corresponding to the environmental temperature is realized without requiring an element such as a temperature sensor that measures the environmental temperature.

Figure 9:
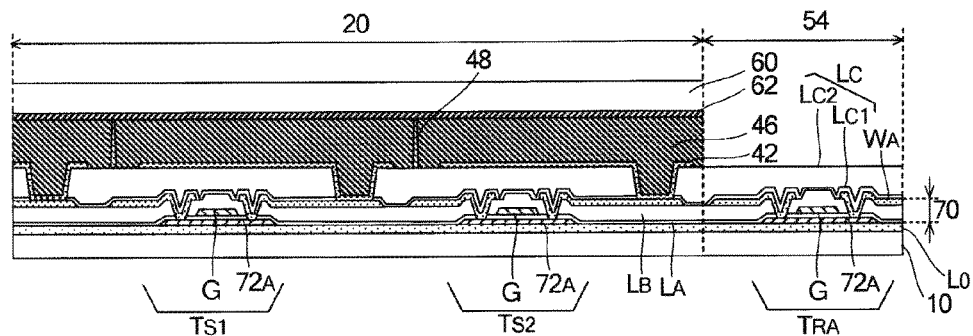
FIG. 9 is a sectional view of transistors of an element section.

FIG. 9 is an explanatory diagram of the structure of the display device 100. In FIG. 9, for convenience, both of a cross section of a region on the inner side of the pixel section 20 and a cross section of a region on the outer side of the pixel section 20 are shown. As illustrated in FIG. 9, an insulating film L0 is formed on the surface of the element substrate 10 formed of a semiconductor material such as silicon. On the surface of the insulating film L0, the transistors (TS1 and TS2) of the pixel circuits PIX are formed in the region on the inner side of the pixel section 20 and the transistors (TRA and TRB) of the voltage control circuit 54 are formed in the region on the outer side of the pixel section 20. Note that, in FIGS. 9 to 13, only the transistor TRA of the voltage control circuit 54 is shown for convenience.

The transistors (TS1, TS2, and TRA) are covered with an insulating layer LC. The insulating layer LC in this embodiment is configured by stacking a first layer LC1 and a second layer LC2. In the region on the inside of the pixel section 20, the pixel electrode 42 electrically connected to the transistors (TS1 and TS2) via a conduction hole piercing through the insulating layer LC is disposed. The element substrate 10 and the opposite substrate 60 are joined in a state in which the pixel electrode 42 and the opposite electrode 62 are opposed to each other. Partition walls 48 are formed in a gap between the element substrate 10 and the opposite substrate 60. The electrophoretic element 46 is encapsulated in spaces partitioned by the partition walls 48.

The transistors (TS1 and TS2) in the region on the inner side of the pixel section 20 include semiconductor layers 72A formed on the surface of the insulating film L0, a gate insulating film LA that covers the semiconductor layers 72A, gates G formed on the gate insulating film LA, an insulating layer LB that covers the surfaces of the gates G, and wires WA (a source and a drain) connected to the semiconductor layers 72A via conduction holes of the insulating layer LB. Similarly, the transistor TRA formed in the region on the outer side of the pixel section 20 includes the semiconductor layer 72A formed on the surface of the insulating film L0, the gate insulating film LA that covers the semiconductor layer 72A, the gate G formed on the gate insulating film LA, the insulating layer LB that covers the surface of the gate G, and the wires WA. The transistor TS1 and the transistor TS2 in the region on the inner side of the pixel section 20 and the transistor TRA and the transistor TRB of the output section 50[n] on the outer side of the pixel section 20 are formed in a common process. The elements (the semiconductor layers 72A, the gate insulating film LA, the gates G, the insulating layer LB, and the wires WA) common to the transistors (TS1, TS2, and TRA) can be represented as an element section 70 formed on the element substrate 10.

Manufacturing Method for the Display Device 100

Figure 10:
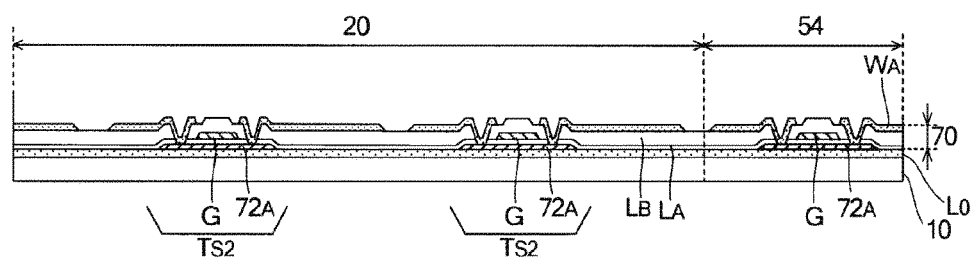
FIG. 10 is an explanatory diagram of a manufacturing process for a display device substrate.

FIGS. 10 to 13 are explanatory diagrams of a manufacturing process for the display device 100. A first process shown in FIG. 10 is started in a state in which the surface of the element substrate 10 is covered with the insulating film L0.

In the first process, the element section 70 is formed on the element substrate 10. Specifically, as illustrated in FIG. 10, an a-Si (amorphous-silicon) layer is formed on the surface of the insulating film L0 and the a-Si layer is crystallized by heat treatment to form a p-Si (Polycrystalline Silicon) layer. In the next resist process (resist coat formation, exposure, development, etc.), a resist pattern is formed on the p-Si layer and the semiconductor layer 72A is formed. An impurity element is injected into a source/drain region of the semiconductor layer 72A. Subsequently, the gate insulating film LA covering the semiconductor layer 72A is formed and the gates G are formed on the surface of the gate insulating film LA. The gates G of the transistors (TS1 and TS2) of the pixel section 20 are formed integrally with the scanning line 24. Subsequently, the insulating layer LB is formed on the surfaces of the gates G of the transistors (TS1, TS2, and TRA). Conduction holes (contact holes) piercing through the insulating layer LB and the gate insulating film LA are formed by the resist process. The wires WA are formed of a metal material such as aluminum. The wires WA of the transistors (TS1 and TS2) of the pixel section 20 are, for example, formed integrally with the first signal line 22A and the second signal line 22B. Specifically, the wires WA of the transistor TS1 are formed integrally with the first signal line 22A and the wires WA of the transistor TS2 are formed integrally with the second signal line 22B.

Figure 11:
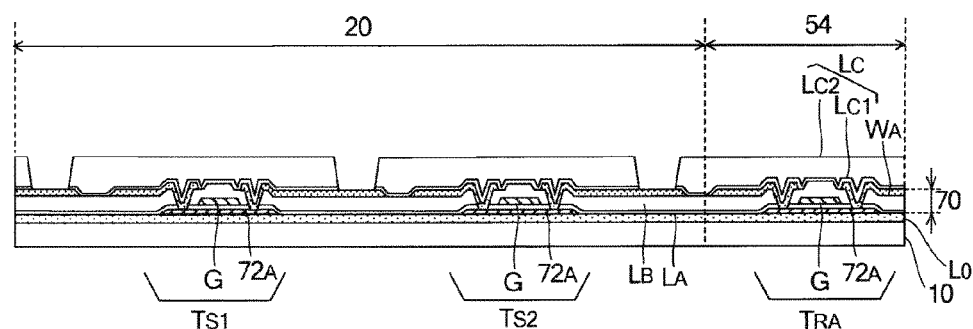
FIG. 11 is an explanatory diagram of the manufacturing process for the display device substrate.

In a second process following the first process, the insulating layer LC covering the element section 70 is formed. Specifically, as illustrated in FIG. 11, the first layer LC1 and the second layer LC2 are stacked on the surface of the element section 70, whereby the insulating layer LC covering the wires WA is formed. Conduction holes piercing through the insulating layer LC are formed. As explained above, in the second process, as in the first process, the insulating layer LC is formed in the common processing on the inner side and the outer side of the pixel section 20.

Figure 12:
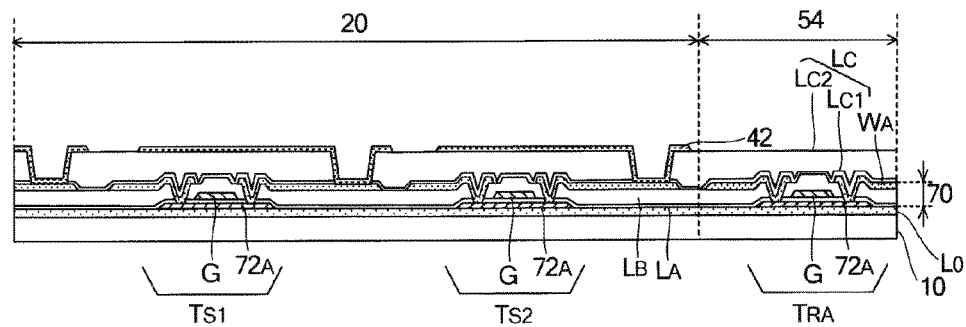
FIG. 12 is an explanatory diagram of the manufacturing process for the display device substrate.
Figure 13:
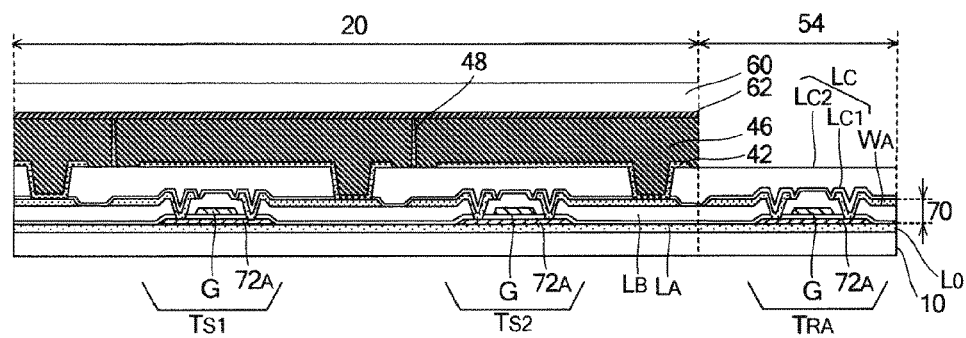
FIG. 13 is an explanatory diagram of a manufacturing process for the display device.

In a third process following the second process, the pixel electrodes 42 electrically connected to the element section 70 via the conduction holes of the insulating layer LC formed in the second process are formed. The pixel electrodes 42 are formed of a conductive material such as aluminum. As shown in FIG. 12, the pixel electrodes 42 are electrically connected to the wires WA of the transistors (TS1 and TS2) via the conduction holes of the insulating layer LC. A display device substrate 80 of the display device 100 is formed according to the first to third processes. The display device substrate 80 includes the element section 70, the insulating layer LC, and the pixel electrodes 42.

In a fourth process following the third process, the partition walls 48 are formed on the surface of the insulating layer LC. A planar shape of the partition walls 48 is optional. However, the partition walls 48 are formed for each of the pixel circuits PIX (or in a lattice shape for partitioning the space into the pixel circuits PIX). Subsequently, in a state in which the opposite electrode 62 and the pixel electrode 42 are opposed to each other, the display device substrate 80 and the opposite substrate 60 are joined by a seal material (not shown in the figure) at a predetermined interval. The electrophoretic element 46 is encapsulated in a gap between the display device substrate 80 and the opposite substrate 60.

As explained above, in the first process, the transistors (TS1 and TS2) in the region on the inside of the pixel section 20 and the transistors (TRA and TRB) in the region (the voltage control circuit 54) on the outside of the pixel section 20 are formed in a common process. Therefore, compared with a configuration in which the transistors included in the voltage control circuit 54 are formed in a process separate from a process for forming the transistors (TS1 and TS2) of the pixel section 20, there is an advantage that it is possible to simplify a manufacturing process.

Electronic Apparatus

Figure 14:
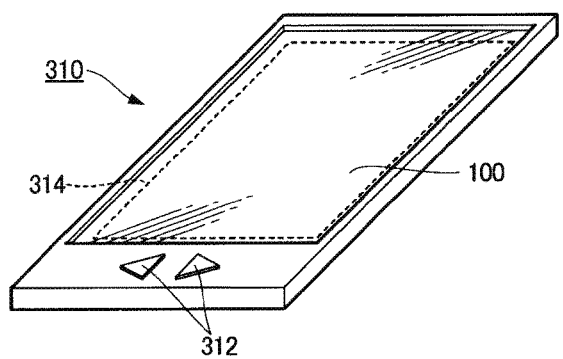
FIG. 14 is a perspective view of an electronic apparatus (an information terminal).

An electronic apparatus applied with the invention is illustrated below. FIG. 14 is a perspective view of a portable information terminal (electronic book) 310 including the display device 100. As shown in FIG. 14, the information terminal 310 includes an operator 312 operated by a user and the display device 100 that displays an image on the display section 314. When the operator 312 is operated by the user, a display image on the display section 314 is switched.

Figure 15:
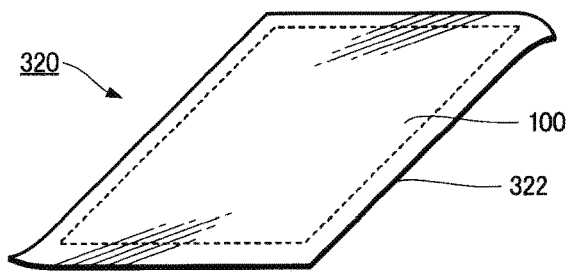
FIG. 15 is a perspective view of an electronic apparatus (electronic paper).

FIG. 15 is a perspective view of electronic paper 320 including the display device 100. As shown in FIG. 15, the electronic paper 320 includes the display device 100 formed on the surface of a flexible substrate (sheet) 322.

The electronic apparatus applied with the invention is not limited to the above illustration. For example, the display device 100 according to the invention can be applied to various electronic apparatuses such as a cellular phone, a watch (a wristwatch), a portable acoustic reproduction apparatus, an electronic notebook, and a touch-panel mounted display device.

Modification 1

The form explained above can be variously modified. Specific forms of the modification are illustrated below. Two or more forms optionally selected from the following illustrations can be combined as appropriate in a range in which the forms are not contradictory to one another.

(1) In the embodiment explained above, the channel width W of the transistor TRA and the transistor TRB of the inverter circuit INV-2 (the voltage control circuit 54) is larger than the channel width W of the transistor TRA and the transistor TRB of the other inverter circuits (INV-1, INV-3, and INV-4). Besides the above illustration, for example, a configuration can also be suitably adopted in which both of the channel length L and the channel width W of the transistor TRA and the transistor TRB of the inverter circuit INV-2 (the voltage control circuit 54) are larger than the channel length L and the channel width W of the transistor TRA and the transistor TRB of the other inverter circuits (INV-1, INV-3, and INV-4). For example, a configuration can also be suitably adopted in which, when the channel length L and the channel width W of the transistor TRA and the transistor TRB of the inverter circuits (INV-1, INV-3, and INV-4) are respectively set to 3 µm and 3 µm, in the transistor TRA and the transistor TRB of the inverter circuit INV-2 (the voltage control circuit 54), the channel length L is set to 30 µm and the channel width W is set to 30 µm. With the configuration explained above, a gate capacity of the transistor TRA and the transistor TRB of the inverter circuit INV-2 (the voltage control circuit 54) increases. Therefore, it is possible to sufficiently secure the length of time (the delay time ΔT) for feeding an electric current to the pixel electrode 42 and, as a result, facilitate the heating of the electrophoretic element 46 by the heat generation of the pixel electrode 42.

Figure 16:
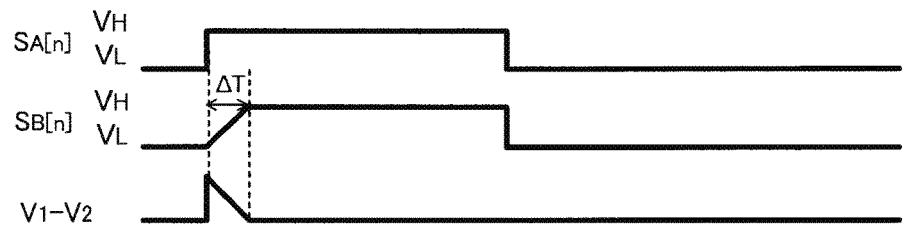
FIG. 16 is an explanatory diagram of an electric current flowing in a pixel electrode.

(2) In the first embodiment, a voltage waveform of the second driving signal SB[n] is shown as a rectangular wave as illustrated in FIG. 4. Actually, the voltage waveform of the second driving signal SB[n] becomes dull as illustrated in FIG. 16 because of a capacitance characteristic or the like of the second transistor TS2. Therefore, the voltage difference (V1−V2) between the first connection point P1 and the second connection point P2 changes with time as illustrated in FIG. 16.

(3) In the first embodiment, the electrophoretic element 46 of the partition wall type is illustrated in which the charged particles 462 (462B and 462W) and the dispersion medium 464 are encapsulated in the spaces partitioned by the partition walls 48. However, a form of the electrophoretic element 46 is not limited to the above illustration. For example, a configuration can also be suitably adopted in which the charged particles 462 (462B and 462W) and the dispersion medium 464 are encapsulated on the inside of a microcapsule. Further, a configuration can also be suitably adopted in which a plurality of particles charged in opposite polarities in a black region and a white region are dispersed in the dispersion medium. In this embodiment, the electrophoretic element 46 is illustrated as the electro-optical element. However, a configuration is also suitable in which a liquid crystal element or the like is used as the electro-optical element. As it is understood from the above explanation, the invention is suitably adopted in a configuration including an electro-optical element, a display gradation of which changes according to application of a voltage. The electrophoretic element 46 and the liquid crystal element are typical examples of the electro-optical element.

(4) In the first embodiment, the configuration is illustrated in which the output section 50[n] is disposed on the element substrate 10. However, the position of the output section 50[n] is not limited to the above illustration. For example, the output section 50[n] may be set on the opposite substrate 60. The first driving signal SA[n] and the second driving signal SB[n] may be output from the output section 50[n] to the signal line pair 22. However, in the embodiment, since the transistors (TRA and TRB) of the output section 50[n] are formed on the element substrate 10 together with the transistors (TS1 and TS2) included in the pixel circuit PIX, it is unnecessary to form a transistor on the opposite substrate 60. Therefore, compared with a configuration in which the pixel circuit PIX is formed on the element substrate 10 and the output section 50[n] is formed on the opposite substrate 60, there is an advantage that the manufacturing process for the display device 100 is simplified.

(5) In the first embodiment, the configuration is illustrated in which the voltage generation circuit 36 is provided on the element substrate 10 together with the driving circuit 30. However, a setting position of the voltage generation circuit 36 is not limited to the above illustration. For example, a configuration can be adopted in which the voltage generation circuit 36 is set on the opposite substrate 60. Further, a configuration can be adopted in which the voltage generation circuit 36 is set in a host apparatus on the outside. In the configuration in which the voltage generation circuit 36 is set in the host apparatus on the outside, the voltage VH and the voltage VL are supplied from the host apparatus together with various control signals such as a synchronization signal and image signals.

Figure 17:
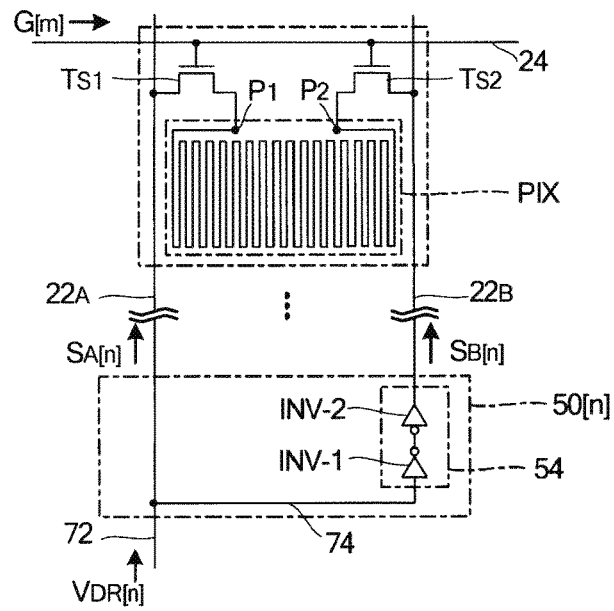
FIG. 17 is a configuration diagram of the output section according to a modification.

(6) In the first embodiment, both of the voltage control circuit 52 and the voltage control circuit 54 are set in the output section 50. However, as illustrated in FIG. 17, a configuration can also be suitably adopted in which the output section 50[n] includes only the voltage control circuit 54 (the voltage control circuit 52 is removed). In a configuration shown in FIG. 18, the driving signal VDR[n] of the voltage VH or the voltage VL is output from the signal-line driving circuit 34 to the wire 72. The output section 50[n] outputs the driving signal VDR[n] to the first signal line 22A as the first driving signal SA[n] and, on the other hand, generates the second driving signal SB[n] of the voltage VH or the voltage VL delayed with respect to the driving signal VDR[n] and outputs the second driving signal SB[n] to the second signal line 22B. With the configuration explained above, as in the first embodiment, an electric current corresponding to the level difference (V1–V2) between the voltages at the first connection point P1 and the second connection point P2 flows in the pixel electrode 42, whereby the pixel electrode 42 generates heat. Therefore, it is possible to facilitate the heating of the electrophoretic element 46. As it is understood from the above explanation, the output section 50[n] is comprehensively represented as an element that supplies the first driving signal SA[n] to the first signal line 22A and supplies the second driving signal SB[n] delayed with respect to the first driving signal SA[n] to the second signal line 22B. A specific configuration of the output section 50[n] may be any configuration. The output section 50[n] may or may not include a function of adjusting voltage amplitude.

(7) In the first embodiment, although the configuration is illustrated in which the common voltage VCOM fluctuating between the voltage VH and the voltage VL is supplied to the opposite electrode 62, the common voltage VCOM may be fixed to a constant voltage. However, in a configuration in which the common voltage VCOM is fixed to the constant voltage, it is necessary to switch the voltage of the first driving signal SA[n] and the second driving signal SB[n] according to a gradation between the voltage VH on the high potential side and the voltage VL on the low potential side with respect to the common voltage VCOM.

(8) In the embodiment, each of the voltage control circuit 54 and the voltage control circuit 52 includes the inverter circuits INV in the two stages. However, the number of stages of the inverter circuits INV included in the voltage control circuit 52 and the voltage control circuit 54 is optional. The voltage control circuit 54 and the voltage control circuit 52 can include, for example, the inverter circuits INV of three or more stages.

Second Embodiment

Figure 18:
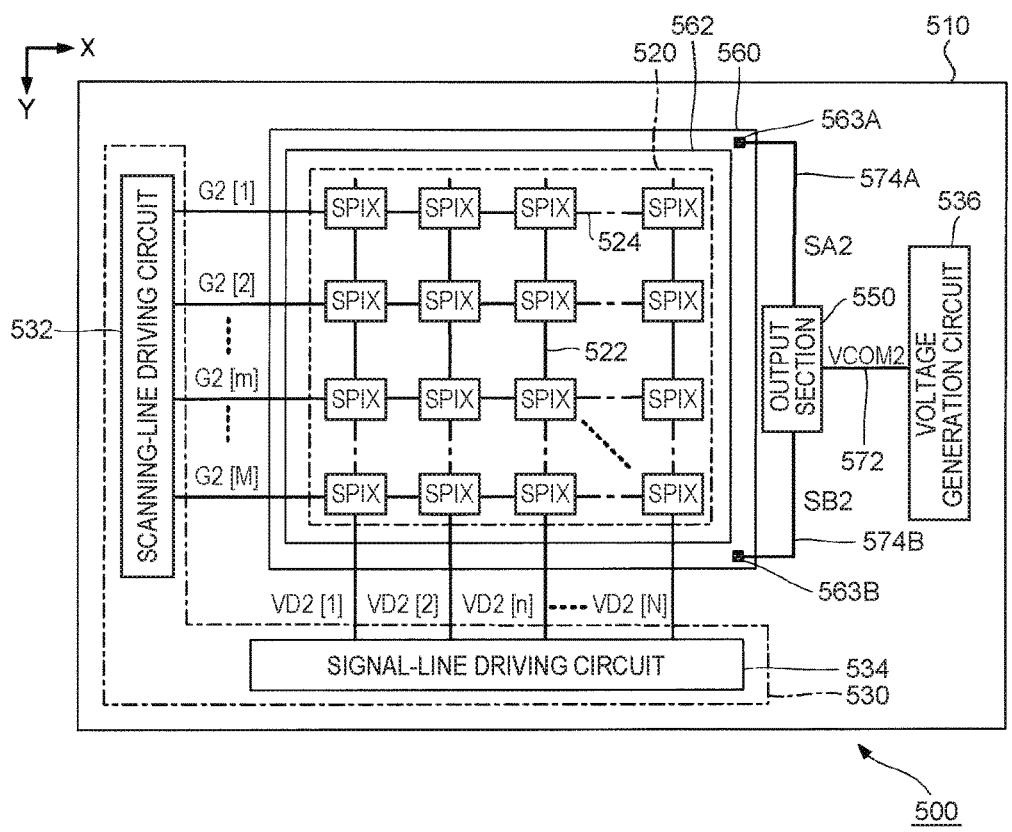
FIG. 18 is a configuration diagram of a display device according to an embodiment of the invention.

FIG. 18 is a block diagram of a display device 500 according to an embodiment of the invention. The display device 500 is an electro-optical device including an electrophoretic element, a display gradation of which changes according to application of a voltage. The display device 500 includes an element substrate 510 and an opposite substrate 560 opposed to each other. The opposite substrate 560 is located on an observation side (a side of an observer who visually recognizes a display image displayed by the display device 500) viewed from the element substrate 510. The element substrate 510 and the opposite substrate 560 are joined by a seal material (not shown in the figure) at a predetermined interval. An electrophoretic element is encapsulated in a gap between both the substrates.

On a surface of the element substrate 510 opposed to the opposite substrate 560, as illustrated in FIG. 18, a pixel section 520 including a plurality of pixel circuits SPIX, a driving circuit 530 that drives the pixel circuits SPIX, a voltage generation circuit 536, and an output section 550 are set. On the other hand, the opposite substrate 560 is a light-transmitting substrate of glass, quartz, or the like. An opposite electrode 562 is formed on the surface opposed to the element substrate 510. The opposite electrode 562 is a light-transmitting conductive layer of ITO (Indium Tin Oxide) or the like and is continuous over the plurality of pixel circuits SPIX in plan view.

The voltage generation circuit 536 generates a voltage VH2 and a voltage VL2. The voltage VH2 is higher than the voltage VL2 (VH2>VL2). The voltage VH2 is set to, for example, 10 V to 15 V. The voltage VL2 is set to, for example, 0V. The voltage VH2 and the voltage VL2 generated by the voltage generation circuit 536 are supplied to the driving circuit 530. The voltage generation circuit 536 generates and outputs a common voltage VCOM2 set to the voltage VH2 or the voltage VL2. The common voltage VCOM2 generated by the voltage generation circuit 536 is supplied to the output section 550 via a wire 572. The output section 550 outputs a first driving signal SA2 and a second driving signal SB2 corresponding to the common voltage VCOM2. A specific configuration of the output section 550 and a relation between the first driving signal SA2 and the second driving signal SB2 are explained below.

A conduction section 563A and a conduction section 563B (so-called silver points) are formed between the element substrate 510 and the opposite substrate 560. Specifically, the conduction section 563A is formed at a corner portion on the negative side in the Y direction of the opposite substrate 560 and connected to a wire 574A on the element substrate 510. The conduction section 563B is formed at a corner portion on the opposite side (the positive side in the Y direction) of the conduction section 563A on the opposite substrate 560 and connected to a wire 574B on the element substrate 510. The first driving signal SA2 output by the output section 550 is supplied to the opposite electrode 562 via the wire 574A and the conduction section 563A. The second driving signal SB2 output by the output section 550 is supplied to the opposite electrode 562 via the wire 574B and the conduction section 563B.

Figure 19:
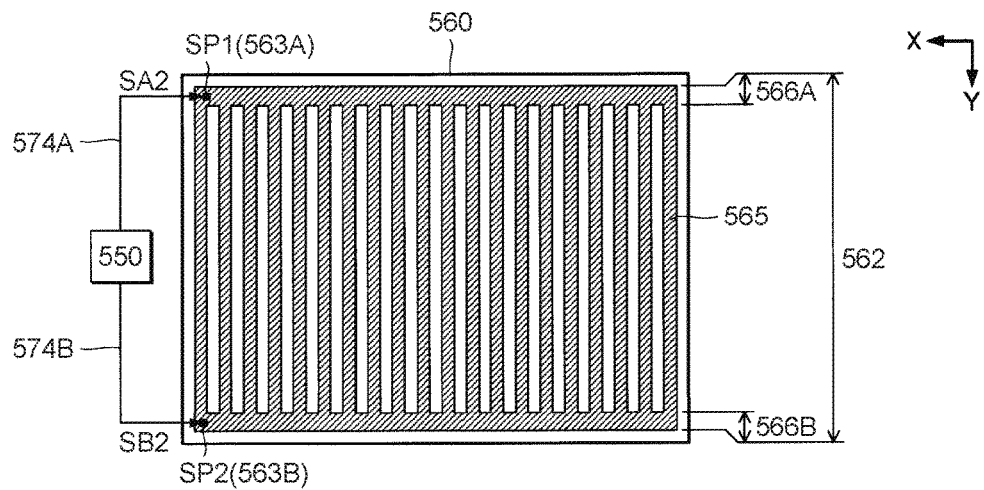
FIG. 19 is a configuration diagram of an opposite electrode.

FIG. 19 is an explanatory diagram of the opposite electrode 562. As illustrated in FIG. 19, the opposite electrode 562 includes a first common wiring section 566A and a second common wiring section 566B and a plurality of electrode sections 565. The first common wiring section 566A and the second common wiring section 566B and the plurality of electrode sections 565 are integrally formed of a light-transmitting conductive material such as ITO. However, the first common wiring section 566A and the second common wiring section 566B and the plurality of electrode sections 565 can also be respectively formed in separate layers and connected to one another. For example, the plurality of electrode sections 565 can be formed of a conductive material such as ITO and, on the other hand, the first common wiring section 566A and the second common wiring section 566B can be formed of a conductive material having low resistance compared with the resistance of the electrode sections 565.

The first common wiring section 566A is a belt-like wire extending along the X direction and is formed in a region extending along an edge side on the negative side in the Y direction (a direction crossing the X direction) on the opposite substrate 560. As illustrated in FIG. 19, the first common wiring section 566A includes a first connection point SP1. The first connection point SP1 is, for example, a portion overlapping the conduction section 563A in plan view in the first common wiring section 566A. In the configuration illustrated in FIG. 19, the first connection point SP1 is located at an end portion on the positive side in the X direction in the first common wiring section 566A. The first driving signal SA2 is supplied to the first connection point SP1 from the output section 550 via the wire 574A and the conduction section 563A. Therefore, a voltage SV1 of the first common wiring section 566A is set to a voltage of the first driving signal SA2.

The second common wiring section 566B is a belt-like electrode extending along the X direction like the first common wiring section 566A and is formed in a region extending along an edge side on the positive side in the Y direction on the opposite substrate 560. The second common wiring section 566B includes a second connection point SP2. The second connection point SP2 is, for example, a portion overlapping the conduction section 563B in the second common wiring section 566B. In the configuration illustrated in FIG. 19, the second connection point SP2 is located at an end portion on the positive side in the X direction in the second common wiring section 566B. The second driving signal SB2 is supplied to the second connection point SP2 from the output section 550 via the wire 574B and the conduction section 563B. Therefore, a voltage SV2 of the second common wiring section 566B is set to a voltage of the second driving signal SB2.

The first common wiring section 566A and the second common wiring section 566B are disposed to be separated from each other at an interval in the Y direction. Each of the plurality of electrode sections 565 is a belt-like (or linear) wire extending along the Y direction at an interval from each other over the first common wiring section 566A and the second common wiring section 566B. The plurality of electrode sections 565 are formed in shapes equal to one another (e.g., at line widths equal to one another) and arrayed at an equal interval in the X direction. That is, the plurality of electrode sections 565 are substantially equally distributed in the X direction within a region between the first common wiring section 566A and the second common wiring section 566B on the surface of the opposite substrate 560. The dimensions of the first common wiring section 566A, the second common wiring section 566B, and the electrode sections 565 are optional. However, for example, the first common wiring section 566A and the second common wiring section 566B are formed at substantially equivalent line widths. The electrode sections 565 are formed in small line width compared with the first common wiring section 566A and the second common wiring section 566B.

In a state in which the voltage SV1 of the first common wiring section 566A and the voltage SV2 of the second common wiring section 566B are differentiated, an electric current corresponding to a voltage difference (SV1–SV2) between the voltage SV1 and the voltage SV2 flows to the plurality of electrode sections 565. The electrode sections 565 (the opposite electrode 562) generate heat. In this embodiment, the electrophoretic element 46 is heated by the heat generation of the opposite electrode 562. That is, the opposite electrode 562 in the embodiment also functions as a heating wire for heating the electrophoretic element 46 in addition to the original function of an electrode for applying a voltage to the electrophoretic element 46. From the viewpoint of efficiently heating the electrophoretic element 46, in this embodiment, the electrode sections 565 are formed in a linear shape having high resistance to secure the resistance of the electrode sections 565. From the viewpoint of causing the electrode sections 565 to uniformly generate heat within the region of the electrode sections 565, the electrode sections 565 are disposed at an equal interval from the positive side to the negative side in the X direction.

The pixel section 520 shown in FIG. 18 includes M scanning lines 524 extending in the X direction and N signal lines 522 extending in the Y direction crossing the X direction (typically, orthogonal to the x direction) (M and N are natural numbers). The plurality of pixel circuits SPIX are disposed to correspond to crossings of the scanning lines 524 and the signal lines 522 and arrayed in a matrix shape of M rows and N columns.

Figure 20:
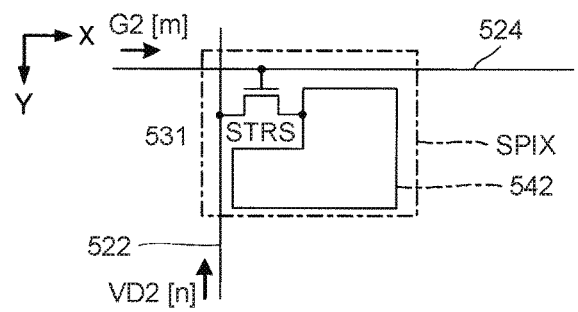
FIG. 20 is a circuit diagram of a pixel circuit.

FIG. 20 is a circuit diagram of the pixel circuit SPIX. In FIG. 20, any one pixel circuit SPIX located in an m-th row and an n-th column is shown. The pixel circuit SPIX includes a pixel electrode 542 and a transistor STRS. The pixel electrode 542 is an electrode for applying a voltage to the electrophoretic element 46. The transistor STRS functions as a switching element that controls electric connection (conduction/non-conduction) of the signal line 522 and the pixel electrode 542. The transistor STRS is a thin-film transistor of an N-channel type. A gate of the transistor SIRS is connected to the scanning line 524.

Figure 21:
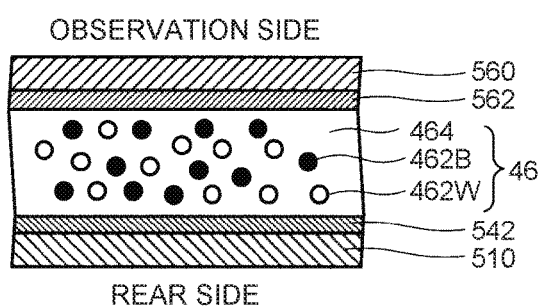
FIG. 21 is an explanatory diagram of driving of an electrophoretic element.

FIG. 21 is an explanatory diagram of the electrophoretic element 46. The electrophoretic element 46 is an electro-optical element representing a gradation using electrophoresis of the charged particles 462. The electrophoretic element 46 is disposed between the pixel electrode 42 and the opposite electrode 562 opposed to each other. The electrophoretic element 46 includes the white charged particles 462W and the black charged particles 462B charged in opposite polarities each other and the dispersion medium 464 in which the charged particles 462 (462B and 462W) are dispersed to be capable of migrating.

The driving circuit 530 shown in FIG. 18 includes a scanning-line driving circuit 532 and a signal-line driving circuit 534. The scanning-line driving circuit 532 and the signal-line driving circuit 534 are mounted on the element substrate 510, for example, in a form of IC chips. The voltage VH2 and the voltage VL2 generated by the voltage generation circuit 536 are supplied to the scanning-line driving circuit 532 and the signal-line driving circuit 534. Besides, various control signals such as a synchronization signal and an image signal designating a display gradation are supplied to the scanning-line driving circuit 532 and the signal-line driving circuit 534 from a host apparatus on the outside.

Figure 22:
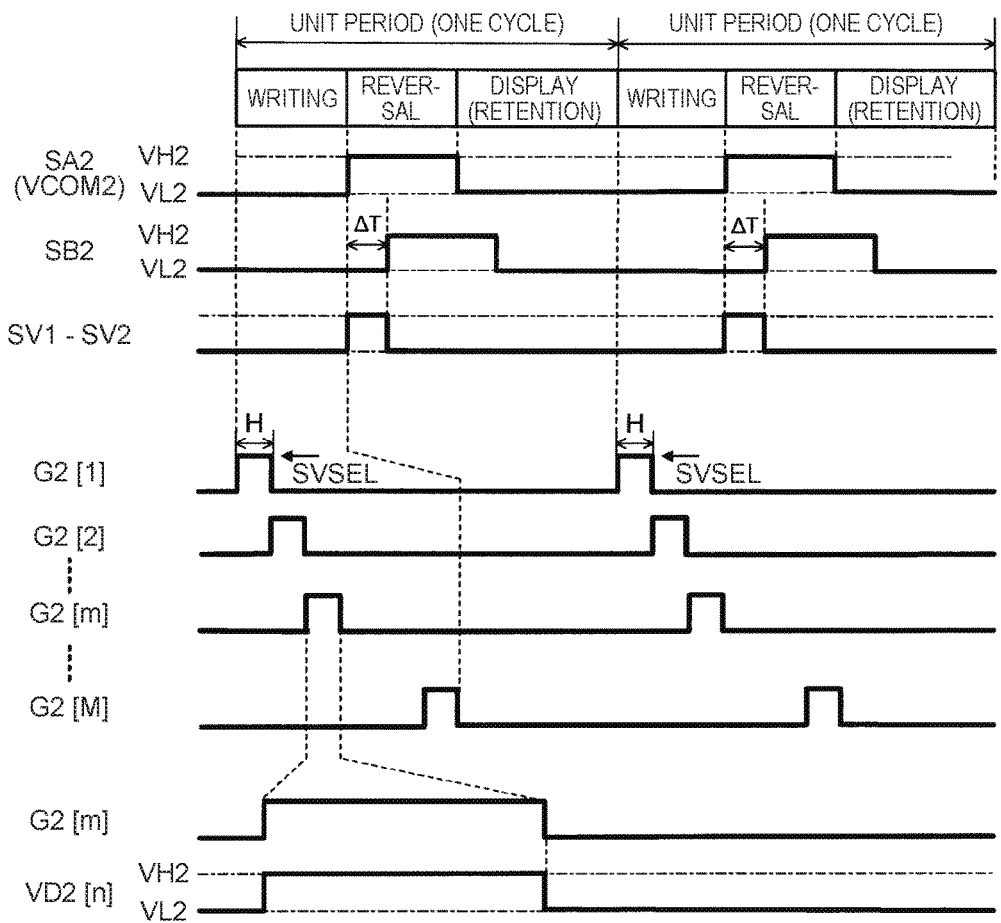
FIG. 22 is a timing chart showing the operation of the display device.

FIG. 22 is a timing chart of the operation of the display device 500. Each unit period (one frame) set as a cycle of the operation of the display device 500 includes a writing period, a reversal period, and a display period. In the writing period, a writing operation for supplying a voltage corresponding to a designated gradation of the pixel circuit SPIX to the pixel circuits SPIX is executed. In the reversal period, a change in a voltage of the pixel electrode 542 in the writing period is actually reflected on a display gradation of pixels. In the display period, the display gradation of the pixels is maintained.

As illustrated in FIG. 22, in the writing period of each unit period, the scanning-line driving circuit 532 sequentially selects each of the M scanning lines 524 from the first row to the M-th row in every horizontal scanning period H according to outputs of scanning signals G2[1] to G2[M]. Specifically, a scanning signal G2[$m$] supplied to the scanning line 524 in the m-th row (m=1 to M) is set to a predetermined selection voltage VSEL2, whereby the scanning line 524 in the m-th row is selected.

The signal-line driving circuit 534 supplies, in parallel, gradation signals VD2[1] to VD2[N] to N signal lines 522 different from one another. A gradation signal VD2[n] supplied to the signal line 522 in the n-th column (n=1 to N) when the scanning line 524 in the m-th row is selected is set to a voltage (the voltage VH2 or the voltage VL2) corresponding to a gradation designated in the pixel circuit SPIX located in the n-th column of the m-th row.

When the scanning-line driving circuit 532 sets the scanning signal G2[m] to the selection voltage VSEL2 in the m-th horizontal scanning period H in the writing period to select the scanning line 524 in the m-th row, the transistor SIRS of the pixel circuits SPIX in the m-th row is controlled to an ON state. When the transistor SIRS transitions to the ON state, the voltage of the pixel electrode 542 is set to a voltage (the voltage VH2 or the voltage VL2) of the gradation signal VD2[n] output to the signal line 522 by the signal-line driving circuit 534.

On the other hand, the common voltage VCOM2 supplied to the opposite electrode 562 is also set to the voltage VH2 or the voltage VL2. As it is grasped from the above explanation, ranges of voltages of the gradation signal VD2[n] and the common voltage VCOM2 coincide with each other. As illustrated in FIG. 22, the common voltage VCOM2 (the first driving signal SA2) of the opposite electrode 562 is maintained at the voltage VL2 in the writing period and the display period and is set to the voltage VH2 in the reversal period.

FIGS. 23A to 23D are explanatory diagrams of display gradations in the periods in the unit period. In FIGS. 23A to 23D, for convenience, an example is shown in which the black charged particles 462B are charged to a positive polarity and the white charged particles 462W are charged to a negative polarity. Attention is directed to changes in a display gradation of a pixel A2 corresponding to any one pixel electrode 542 and a display gradation of the pixel B2 corresponding to another pixel electrode 542.

Figure 23A:
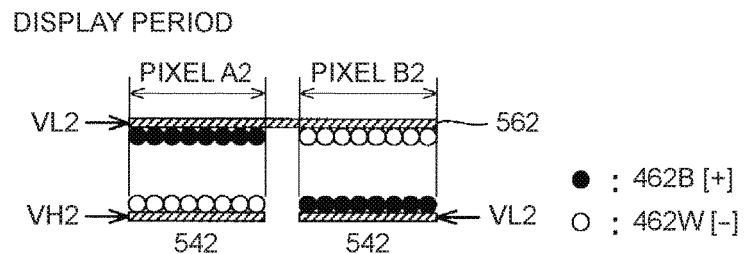
FIGS. 23A to 23D are specific explanatory diagrams of a writing period, a reversal period, and a display period.

First, in the display period, as illustrated in FIG. 23A, it is assumed that the voltage VL2 is applied to the opposite electrode 562, the voltage VH2 is applied to the pixel electrode 542 of the pixel A2, and the voltage VL2 is applied to the pixel electrode 542 of the pixel B2. In the pixel A2, the black charged particles 462B charged in the positive polarity are located on the opposite electrode 562 side and the white charged particles 462W charged in the negative polarity are located on the pixel electrode 542 side. Therefore, the pixel A2 displays a black gradation. On the other hand, in the pixel B2, contrary to the pixel A2, the white charged particles 462W are located on the opposite electrode 562 side and the black charged particles 462B are located on the pixel electrode 542B side. That is, the pixel B2 displays a white gradation.

Figure 23B:
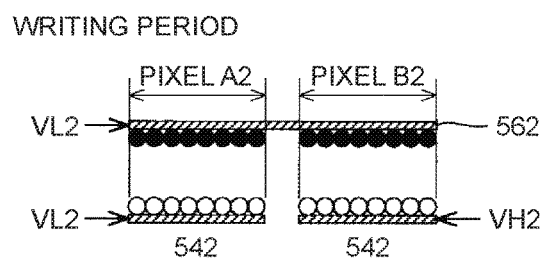

In the writing period, as illustrated in FIG. 23B, it is assumed that the pixel electrode 542 of the pixel A2 transitions from the voltage VH2 to the voltage VL2 and the pixel electrode 542 of the pixel B2 transitions from the voltage VL2 to the voltage VH2. In the writing period, since the opposite electrode 562 is maintained at the voltage VL2, in the pixel B2, the black charged particles 462B move to the opposite electrode 562 side and the white charged particles 462W move to the pixel electrode 542 side. That is, the pixel B2 reverses from the white gradation in the immediately preceding display period to the black gradation. On the other hand, in the pixel A2, since both of the opposite electrode 562 and the pixel electrode 542 have the voltage VL2, a state of the charged particles 462 (462B and 462W) does not change from the immediately preceding display period. That is, the pixel A2 is continuously maintained in the black gradation from the immediately preceding display period.

Figure 23C:
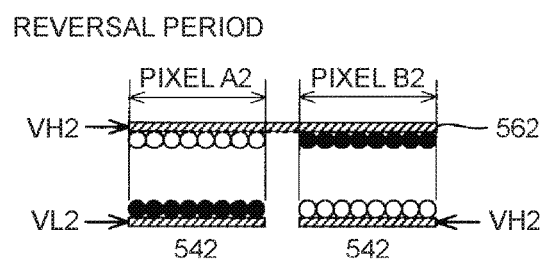
Figure 23D:
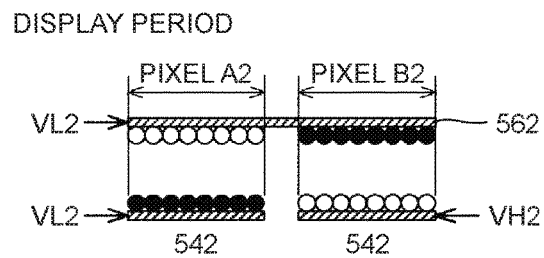

In the immediately following reversal period, as illustrated in FIG. 23C, the opposite electrode 562 transitions from the voltage VL2 to the voltage VH2. Since the pixel electrode 542 of the pixel A2 is maintained at the voltage VL2, the black charged particles 462B move to the pixel electrode 542 side and the white charged particles 462W move to the opposite electrode 562 side. That is, the pixel A2 is reversed from the black gradation to the white gradation. On the other hand, the pixel B2 is continuously maintained in the black gradation from the display period. As illustrated in FIG. 23D, in the display period immediately after the opposite electrode 562 transitions from the voltage VH2 to the voltage VL2, the pixel A2 is maintained in the white gradation and the pixel B2 is maintained in the black gradation. As it is understood from the above explanation, a change in the voltages of the pixel electrode 542 in the writing period is actually reflected on the display gradations of the pixels according to the fluctuation in the voltage of the opposite electrode 562 (the reversal of the common voltage VCOM2) in the reversal period.

The heating of the electrophoretic element 46 by the heat generation of the opposite electrode 562 is explained. As it is understood from FIG. 22, the output section 550 in this embodiment delays the second driving signal SB2 with respect to the first driving signal SA2 and supplies the second driving signal SB2 to the second connection point SP2. Specifically, the output section 550 supplies the common voltage VCOM2 of the voltage VH2 or the voltage VL2 generated by the voltage generation circuit 536 to the first connection point SP1 as the first driving signal SA2 and supplies the second driving signal SB2 of the voltage VH2 or the voltage VL2 delayed with respect to the first driving signal SA2 to the second connection point SP2.

As illustrated in FIG. 22, in the reversal period, the voltage VH2 of the first driving signal SA2 is supplied from the output section 550 to the first connection point SP1. From a point in time delayed with respect to the first driving signal SA2 by the delay time $\Delta T$, the voltage VH2 of the second driving signal SB2 is supplied from the output section 550 to the second connection point SP2. In a period for the delay time $\Delta T$, the voltage SV1 of the first common wiring section 566A is set to the voltage VH2 of the first driving signal SA2 and the voltage SV2 of the second common wiring section 566B is maintained at the voltage VL2 of the second driving signal SB2. That is, in the period for the delay time $\Delta T$, an electric current corresponding to the voltage difference (SV1−SV2) between the first common wiring section 566A and the second common wiring section 566B flows in the plurality of electrode sections 565. As a result, Joule heat corresponding to electric resistance is generated in the electrode sections 565 and the electrophoretic element 46 is heated. As it is understood from the above explanation, as the delay time $\Delta T$ is longer, the length of time in which the electric current flows to the opposite electrode 562 increases and the heating of the electrophoretic element 46 is facilitated.

Figure 24:
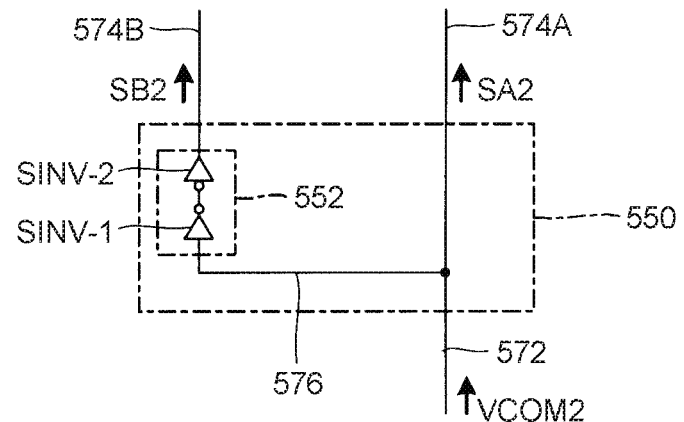
FIG. 24 is a configuration diagram of an output section in the embodiment.

FIG. 24 is an explanatory diagram of the output section 550 in this embodiment. The output section 550 includes a delay circuit 552 as illustrated in FIG. 24. Specifically, in the output section 550 in this embodiment, the wire 572, to which the voltage generation circuit 536 outputs the common voltage VCOM2, branches to the wire 574A and a wire 576. The delay circuit 552 is set between the wire 576 and the wire 574B. The common voltage VCOM2 supplied from the voltage generation circuit 536 to the wire 572 is supplied to the wire 574A as the first driving signal SA2. The delay circuit 552 outputs the second driving signal SB2 delayed with respect to the common voltage VCOM2 supplied to the wire 572, to the wire 574B. For example, as illustrated in FIG. 24, the delay circuit 552 is configured by connecting an inverter circuit SINV-1 and an inverter circuit SINV-2 in two stages.

Figure 25:
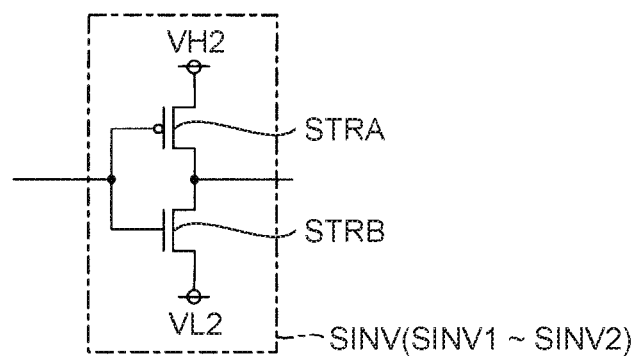
FIG. 25 is a configuration diagram of an inverter circuit.

FIG. 25 is a configuration diagram of the inverter circuit SINV. The inverter circuits SINV (SINV-1 and SINV-2) have a common configuration. Therefore, the inverter circuits SINV (SINV-1 and SINV-2) are explained as the inverter circuit SINV (SINV-1 and INV-2) with reference to FIG. 25. As illustrated in FIG. 25, the inverter circuit SINV includes a transistor STRA of a P-channel type and a transistor STRB of an N-channel type interposed in series between the voltage VH2 on a high potential side and the voltage VL2 on a low potential side. A common input signal is supplied to gates of the transistor STRA and the transistor STRB. The transistor STRA and the transistor STRB are thin-film transistors collectively formed on the surface of the element substrate 510 in a process same as the process for forming the transistor STRS of the pixel section 520.

Channel width W of the transistor STRA and the transistor STRB of the inverter circuit SINV-2 is larger than the channel width W of the transistor STRA and the transistor STRB of the inverter circuit SINV-1. For example, when the channel width W of the transistor STRA and the transistor STRB of the inverter circuit SINV-1 is set to 3 μm, the channel width W of the transistor STRA and the transistor STRB of the inverter circuit SINV-2 is approximately 60 μm (i.e., approximately twenty times). By sufficiently securing a gate capacity (and a time constant) of the transistor STRA and the transistor STRB of the inverter circuit SINV-2 as illustrated above, it is possible to delay the second driving signal SB2 with respect to the first driving signal SA2.

Figure 26:
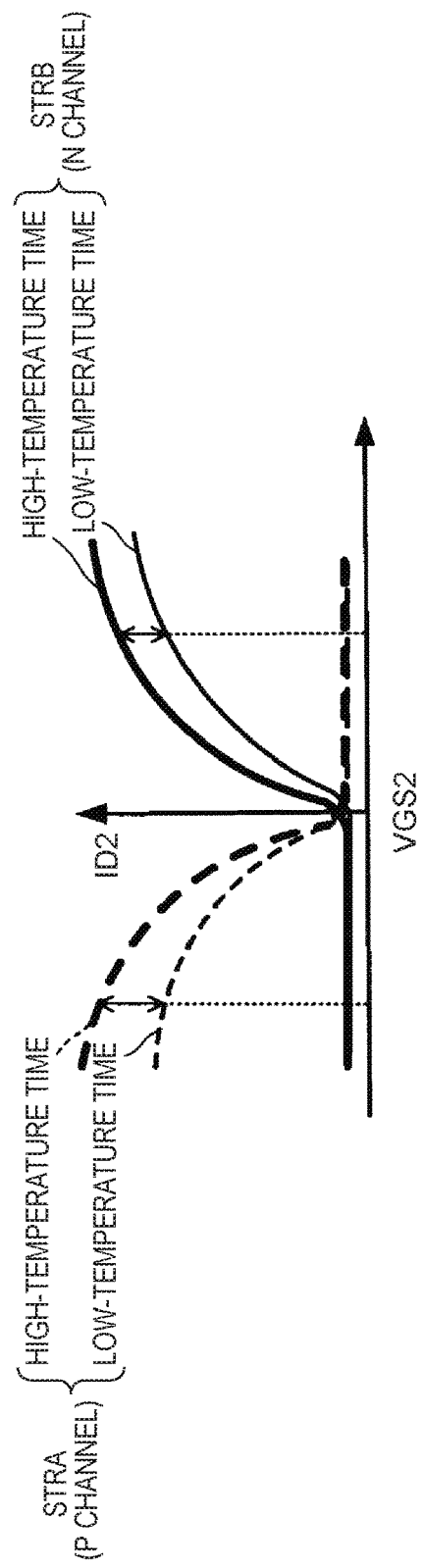
FIG. 26 is a graph showing a relation between an environmental temperature and transistors of an inverter circuit.

FIG. 26 is a graph showing voltage-current characteristics (relations between a voltage VGS2 between a gate and a source and a drain current ID2) of the transistor STRA and the transistor STRB of the inverter circuit SINV (SINV-1 and SINV-2). The voltage-current characteristic of the transistor STRB of the N-channel type is indicated by a solid line. The voltage-current characteristic of the transistor STRA of the P-channel type is indicated by a broken line. The voltage-current characteristics at both the times when temperature at which the display device 500 is used (hereinafter referred to as "environmental temperature") is high and low are shown in the figure.

As it is understood from FIG. 26, the drain current ID2 with respect to a predetermined gate-source voltage VGS2 in the transistor STRA and the transistor STRB decreases as the environmental temperature is lower. Therefore, the delay time ΔT of the second driving signal SB2 with respect to the first driving signal SA2 increases as the environmental temperature drops and the drain current ID2 decreases. Therefore, the heating of the electrophoretic element 46 is facilitated.

As explained above, the second driving signal SB2 supplied from the output section 550 to the second connection point SP2 via the wire 574B and the conduction section 563B is delayed with respect to the first driving signal SA2 supplied from the output section 550 to the first connection point SP1 via the wire 574A and the conduction section 563A. Therefore, for the delay time Δ after the first connection point SP1 fluctuates to the voltage SV1 of the first driving signal SA2, a voltage difference occurs (V1−V2) between the first common wiring section 566A including the first connection point SP1 and the second common wiring section 566B including the second connection point SP2 and an electric current corresponding to the voltage difference flows, whereby the opposite electrode 562 generates heat. That is, in this embodiment, the electrophoretic element 46 is heated by the heat generation of the opposite electrode 562 for applying a voltage to the electrophoretic element 46. Therefore, when compared with a configuration in which a heating wire or the like exclusively used for the heating of the electrophoretic element 46 is set, it is possible to heat the electrophoretic element 46 while suppressing complication of a device configuration. Since the second driving signal SB2 is delayed with respect to the first driving signal SA2, compared with the configuration of Patent Literature 1 for generating separate voltages different from each other and applying the voltages between both the ends of the pixel electrode, there is also an advantage that a configuration for generating a voltage is simplified.

In this embodiment, the electric current corresponding to the voltage difference between the first connection point SP1 and the second connection point SP2 flows to the plurality of electrode sections 565 extending between the first common wiring section 566A and the second common wiring section 566B. Therefore, for example, compared with a configuration in which the rectangular opposite electrode 562 continuous over the substantially entire region of the opposite substrate 560 is formed, it is possible to secure the resistance of the electrode sections 565 and efficiently heat the electrophoretic element 46.

As explained above, the response characteristic of the electrophoretic element 46 changes according to the environmental temperature. Specifically, there is a tendency that, as the environmental temperature is lower, the response characteristic of the electrophoretic element 46 is deteriorated and the display performance is easily deteriorated. In this embodiment, the delay circuit 552 includes the transistor STRA and the transistor STRB having a characteristic that a current amount of the drain current ID2 with respect to the voltage VGS2 between the gate and the source decreases as the environmental temperature is lower. In the configuration explained above, as the environmental temperature is lower, a delay amount of the second driving signal SB2 increases and the length of time ΔT in which an electric current flows to the opposite electrode 562 increases. As a result, the heating of the electrophoretic element 46 by the heat generation of the opposite electrode 562 is facilitated. With the configuration explained above, the heating of the electrophoretic element 46 corresponding to the environmental temperature is realized without requiring an element such as a temperature sensor that measures the environmental temperature.

Of the electrodes (the opposite electrode 562 and the pixel electrode 542) that apply voltages to the electrophoretic element 46, the opposite electrode 562 is disposed near a contact surface with the outdoor air compared with the pixel electrode 542. For example, when a wristwatch applied with the display device 500 is assumed, whereas the pixel electrode 542 is located on the body side of a user, the opposite electrode 562 is located on the outdoor air side when viewed from the pixel electrode 542. Therefore, a portion located on the opposite electrode 562 side in the electrophoretic element 46 is easily affected by the environmental temperature compared with a portion on the pixel electrode 542 side. In this embodiment, the electrophoretic element 46 is heated by the heat generation of the opposite electrode 562. According to this embodiment, since the electrophoretic element 46 is heated by the heat generation of the opposite electrode 562 located on the observation side, compared with the configuration of Patent Literature 1 in which the heat generation of the pixel electrode 542 is used, there is an advantage that it is possible to efficiently heat a portion that particularly has low temperature because of the influence of the outdoor air in the electrophoretic element 46.

In this embodiment, since the transistors (STRA and STRB) of the output section 550 are formed on the element substrate 510 together with the transistor SIRS included in the pixel circuit SPIX, it is unnecessary to form a transistor on the opposite substrate 560. Therefore, there is an advantage that a manufacturing process for the display device 500 is simplified compared with a configuration in which the pixel circuit SPIX is formed on the element substrate 510 and the output section 550 is formed on the opposite substrate 560.

Figure 27:
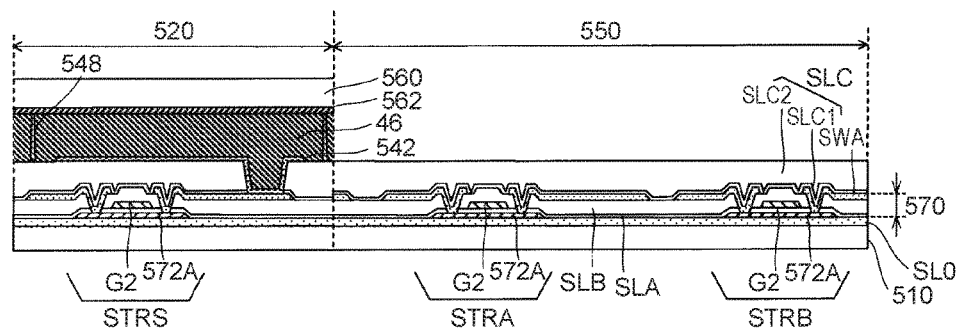
FIG. 27 is a sectional view of transistors of a pixel section.

FIG. 27 is an explanatory diagram of the structure of the display device 500. In FIG. 27, for convenience, both of a cross section of a region on the inner side of the pixel section 520 and a cross section of a region (the output section 550) on the outer side of the pixel section 520 are shown. As illustrated in FIG. 27, an insulating film SL0 is formed on the surface of the element substrate 510 formed of a semiconductor material such as silicon. On the surface of the insulating film SL0, the transistors SIRS of the pixel circuits SPIX are formed in the region on the inner side of the pixel section 520 and the transistors (STRA and STRB) of the delay circuit 552 are formed in the region on the outer side of the pixel section 520.

The transistors (SIRS, STRA, and STRB) are covered with an insulating layer SLC. The insulating layer SLC in this embodiment is configured by stacking a first layer SLC1 and a second layer SLC2. Further, in the region on the inside of the pixel section 520, the pixel electrode 542 electrically connected to the transistor SIRS via a conduction hole piercing through the insulating layer SLC is disposed. The element substrate 510 and the opposite substrate 560 are joined in a state in which the pixel electrode 542 and the opposite electrode 562 are opposed to each other. A partition wall 548 is formed in a gap between the element substrate 510 and the opposite substrate 560. The electrophoretic element 46 is encapsulated in spaces partitioned by the partition wall 548.

The transistor SIRS in the region on the inner side of the pixel section 520 include a semiconductor layer 572A formed on the surface of the insulating film SL0, a gate insulating film SLA that covers the semiconductor layer 572A, a gate SG formed on the gate insulating film SLA, an insulating layer SLB that covers the surface of the gate SG, and wires SWA (a source and a drain) connected to the semiconductor layer 572A via conduction holes of the insulating layer SLB. Similarly, the transistor STRA and the transistor STRB formed in the region on the outer side of the pixel section 520 include the semiconductor layers 572A formed on the surface of the insulating film SL0, the gate insulating film SLA that covers the semiconductor layer 572A, the gates SG formed on the gate insulating film SLA, the insulating layer SLB that covers the surfaces of the gates SG, and the wires SWA. The transistor SIRS in the region on the inner side of the pixel section 520 and the transistor STRA and the transistor STRB of the output section 550 on the outer side of the pixel section 520 are formed in a common process. The elements (the semiconductor layers 572A, the gate insulating film SLA, the gates SG, the insulating layer SLB, and the wires SWA) common to the transistors (SIRS, STRA, and STRB) can be represented as an element section 570 formed on the element substrate 510.

Manufacturing Method for the Display Device 500

Figure 28:
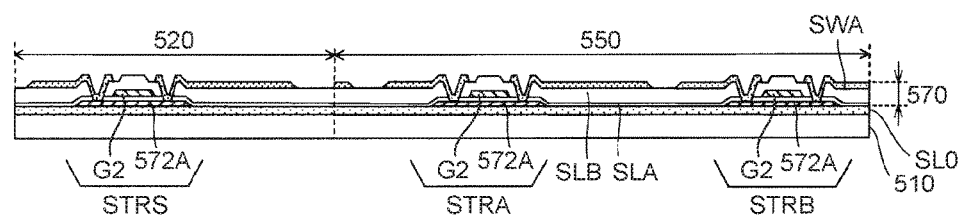
FIG. 28 is an explanatory diagram of a manufacturing process for the display device.

FIG. 28 to FIG. 31 are explanatory diagrams of the manufacturing process for the display device 500. A first process shown in FIG. 28 is started in a state in which the surface of the element substrate 510 is covered with the insulating film SL0.

In the first process, the element section 570 is formed on the element substrate 510. Specifically, as illustrated in FIG. 28, an a-Si (amorphous-silicon) layer is formed on the surface of the insulating film SL0 and the a-Si layer is crystallized by heat treatment to form a p-Si (Polycrystalline Silicon) layer. In the next resist process (resist coat formation, exposure, development, etc.), a resist pattern is formed on the p-Si layer and the semiconductor layer 572A is formed. An impurity element is injected into a source/drain region of the semiconductor layer 572A. Subsequently, the gate insulating film SLA covering the semiconductor layer 572A is formed and the gates SG are formed on the surface of the gate insulating film SLA. The gate SG of the transistor SIRS of the pixel section 520 is formed integrally with the scanning line 524. Subsequently, the insulating layer SLB is formed on the surfaces of the gates SG of the transistors (SIRS, STRA, and STRB). Conduction holes (contact holes) piercing through the insulating layer SLB and the gate insulating film SLA are formed by the resist process. The wires SWA are formed of a metal material such as aluminum. The wires SWA of the transistor STRS of the pixel section 520 are, for example, formed integrally with the signal line 522.

Figure 29:
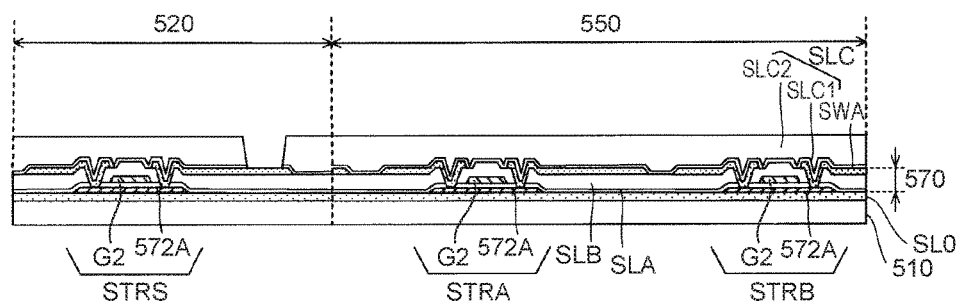
FIG. 29 is an explanatory diagram of the manufacturing process for the display device.

In a second process following the first process, the insulating layer SLC covering the element section 570 is formed. Specifically, as illustrated in FIG. 29, the first layer SLC1 and the second layer SLC2 are stacked on the surface of the element section 570, whereby the insulating layer SLC covering the wires SWA is formed. Conduction holes piercing through the insulating layer SLC are formed. As explained above, in the second process, as in the first process, the insulating layer SLC is formed in the common processing on the inner side and the outer side of the pixel section 520.

Figure 30:
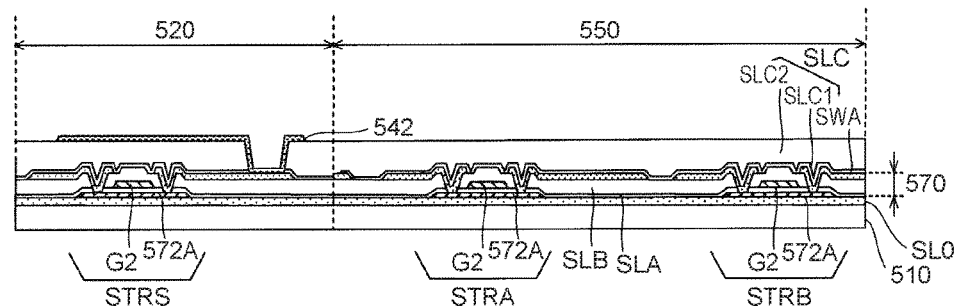
FIG. 30 is an explanatory diagram of the manufacturing process for the display device.
Figure 31:
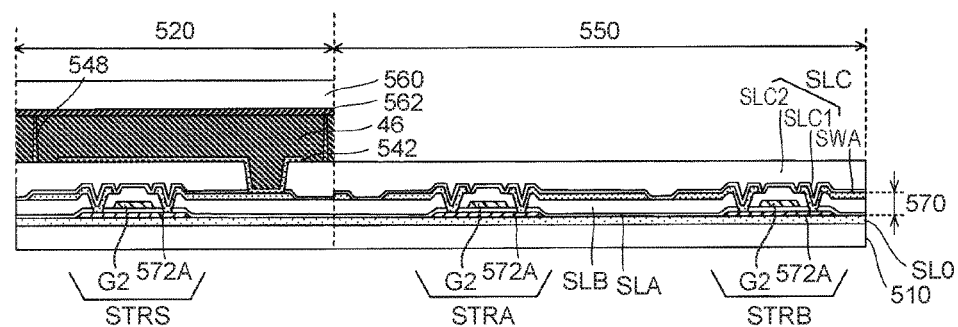
FIG. 31 is an explanatory diagram of the manufacturing process for the display device.

In a third process following the second process, the pixel electrode 542 electrically connected to the element section 570 via the conduction hole of the insulating layer SLC formed in the second process is formed. The pixel electrode 542 is formed of a conductive material such as aluminum. As shown in FIG. 30, the pixel electrode 42 is electrically connected to the wires SWA of the transistor SIRS via the conduction hole of the insulating layer SLC.

In a fourth process following the third process, the partition wall 548 is formed on the surface of the insulating layer SLC. A planar shape of the partition wall 548 is optional. However, the partition wall 548 is formed for each of the pixel circuits SPIX (or in a lattice shape for partitioning the space into the pixel circuits SPIX). Subsequently, in a state in which the opposite electrode 562 and the pixel electrode 542 are opposed to each other, the element substrate 510 and the opposite substrate 560 are joined by a seal material (not shown in the figure) at a predetermined interval. The electrophoretic element 46 is encapsulated in a gap between the element substrate 510 and the opposite substrate 560.

As explained above, in the first process, the transistor STRS in the region on the inside of the pixel section 520 and the transistors (STRA and STRB) in the region (the delay circuit 552) on the outside of the pixel section 520 are formed in a common process. Therefore, compared with a configuration in which the transistor STRA and the transistor STRB included in the delay circuit 552 are formed in a process separate from a process for forming the transistor STRS of the pixel section 520, there is an advantage that it is possible to simplify a manufacturing process.

Electronic Apparatus

Figure 32:
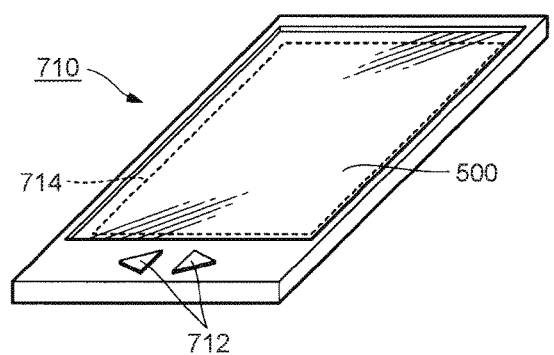
FIG. 32 is a perspective view of an electronic apparatus (an information terminal).

An electronic apparatus applied with the invention is illustrated below. FIG. 32 is a perspective view of a portable information terminal (electronic book) 710 including the display device 500. As shown in FIG. 32, the information terminal 710 includes an operator 712 operated by a user and the display device 500 that displays an image on the display section 714. When the operator 712 is operated by the user, a display image on the display section 714 is switched.

Figure 33:
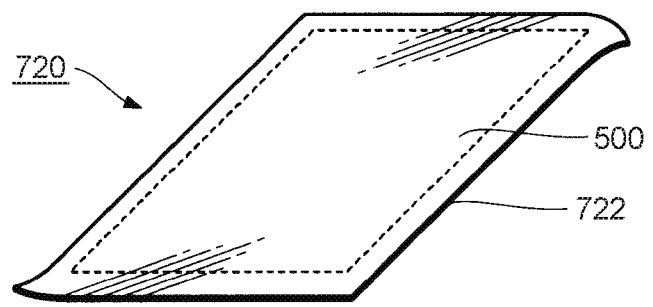
FIG. 33 is a perspective view of an electronic apparatus (electronic paper).

FIG. 33 is a perspective view of electronic paper 720 including the display device 500. As shown in FIG. 33, the electronic paper 720 includes the display device 500 formed on the surface of a flexible substrate (sheet) 722.

The electronic apparatus applied with the invention is not limited to the above illustration. For example, the display device according to the invention can be applied to various electronic apparatuses such as a cellular phone, a watch (a wristwatch), a portable acoustic reproduction apparatus, an electronic notebook, and a touch-panel mounted display device.

Modification 2

The form explained above can be variously modified. Specific forms of the modification are illustrated below. Two or more forms optionally selected from the following illustrations can be combined as appropriate in a range in which the forms are not contradictory to one another.

(1) In the embodiment explained above, the electrophoretic element 46 of the partition wall type is illustrated in which the charged particles 462 (462B and 462W) and the dispersion medium 464 are encapsulated in the spaces partitioned by the partition wall 548. However, a form of the electrophoretic element 46 is not limited to the above illustration. For example, a configuration can also be suitably adopted in which the charged particles 462 (462B and 462W) and the dispersion medium 464 are encapsulated on the inside of a microcapsule. Further, a configuration can also be suitably adopted in which a plurality of particles charged in opposite polarities in a black region and a white region are dispersed in the dispersion medium. In this embodiment, the electrophoretic element 46 is illustrated as the electro-optical element. However, a configuration is also suitable in which a liquid crystal element or the like is used as the electro-optical element. As it is understood from the above explanation, the invention is suitably adopted in a configuration including an electro-optical element, a display gradation of which changes according to application of a voltage. The electrophoretic element 46 and the liquid crystal element are typical examples of the electro-optical element.

(2) In the embodiment explained above, the configuration is illustrated in which the voltage generation circuit 536 is set on the element substrate 510 together with the driving circuit 530. However, a setting position of the voltage generation circuit 536 is not limited to the above illustration. For example, a configuration can be adopted in which the voltage generation circuit 536 is set in a host apparatus on the outside. In the configuration in which the voltage generation circuit 536 is set in the host apparatus on the outside, the voltage VH2 and the voltage VL2 are supplied from the host apparatus together with various control signals such as a synchronization signal and image signals.

Figure 34:
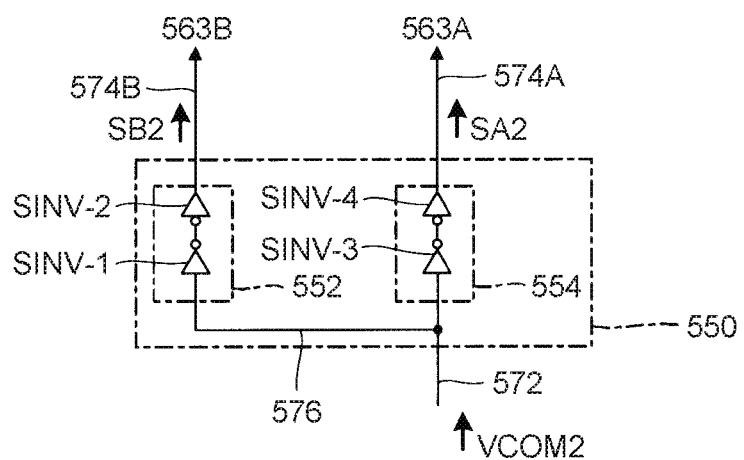
FIG. 34 is a configuration diagram of the output section according to a modification.

(3) In the embodiment explained above, the configuration is illustrated in which the output section 550 includes only the delay circuit 552. However, as illustrated in FIG. 34, a configuration can also be suitably adopted in which the delay circuit 552 and the voltage control circuit 554 are set in the output section 550. The voltage control circuit 554 is a level shifter that adjusts the voltage amplitude of the common voltage VCOM2 of the logical level output from the voltage generation circuit 536 to the wire 572 to generate the first driving signal SA2 of the voltage VH2 or the voltage VL2 and outputs the first driving signal SA2 to the wire 574A. As illustrated in FIG. 34, the voltage control circuit 554 is configured by connecting an inverter circuit SINV-3 and an inverter circuit SINV-4 in two stages. The delay circuit 552 shown in FIG. 34 adjusts the voltage amplitude of the common voltage VCOM2 supplied to the wire 576 branching from the wire 572 and generates the second driving signal SB2 delayed with respect to the first driving signal SA2 and outputs the second driving signal SB2 to the wire 574B. With the configuration explained above, as in the embodiment, an electric current corresponding to the voltage difference (SV1−SV2) between the first connection point SP1 (the first common wiring section 566A) and the second connection point SP2 (the second common wiring section 566B) flows in the electrode sections 565, whereby the opposite electrode 562 generates heat. Therefore, it is possible to facilitate the heating of the electrophoretic element 46. As it is understood from the above explanation, the output section 550 is comprehensively represented as an element that supplies the first driving signal SA2 to the first connection point SP1 and supplies the second driving signal SB2 delayed with respect to the first driving signal SA2 to the second connection point SP2. A specific configuration of the output section 550 may be any configuration. The output section 550 may or may not include a function of adjusting voltage amplitude.

In the configuration in which both of the delay circuit 552 and the voltage control circuit 554 are set in the output section 550, from the viewpoint of securing the delay time ΔT, channel width SW of the transistor STRA and the transistor STRB of the inverter circuit SINV-2 included in the delay circuit 552 is suitably larger than the channel width SW of the transistor STRA and the transistor STRB of the inverter circuits (SINV-3 and SINV-4) included in the voltage control circuit 554. With the configuration explained above, since a gate capacity of the transistor STRA and the transistor STRB of the inverter circuit SINV-2 (the delay circuit 552) increases, it is possible to delay the second driving signal SB2 with respect to the first driving signal SA2. Therefore, it is possible to sufficiently secure the length of time (the delay time ΔT) for feeding an electric current to the opposite electrode 562 and, as a result, facilitate the heating of the electrophoretic element 46 by the heat generation of the opposite electrode 562.

In the configuration in which both of the delay circuit 552 and the voltage control circuit 554 are set in the output section 550, the channel length SL and the channel width SW of the transistor STRA and the transistor STRB of the inverter circuit SINV-2 included in the delay circuit 552 are suitably larger than the channel length SL and the channel width SW of the transistor STRA and the transistor STRB of the inverter circuits (SINV-3 and SINV-4) included in the voltage control circuit 554.

In the second embodiment, the channel width SW of the transistor STRA and the transistor STRB of the inverter circuit SINV-2 (the delay circuit 552) is suitably larger than the channel width SW of the transistor STRA and the transistor STRB of the inverter circuit SINV-1 (the delay circuit 552). Besides the above illustration, for example, a configuration is also suitably adopted in which both of the channel length SL and the channel width SW of the transistor STRA and the transistor STRB of the inverter circuit SINV-2 are larger than the channel length SL and the channel width SW of the transistor STRA and the transistor STRB of the inverter circuit SINV-1. For example, a configuration can also be suitably adopted in which, when the channel length SL and the channel width SW of the transistor STRA and the transistor STRB of the inverter circuit INV-1 are respectively set to 3 µm and 3 µm, in the transistor STRA and the transistor STRB of the inverter circuit INV-2, the channel length SL is set to 60 µm and the channel width W is set to 60 µm. With the configuration explained above, a gate capacity of the transistor STRA and the transistor STRB of the inverter circuit INV-2 increases. Therefore, it is possible to sufficiently secure the length of time (the delay time ΔT) for feeding an electric current to the opposite electrode 562 and, as a result, facilitate the heating of the electrophoretic element 46 by the heat generation of the opposite electrode 562.

(4) In the embodiment explained above, the delay circuit 552 and the voltage control circuit 554 include the inverter circuits SINV in two stages. However, the number of stages of the inverter circuits SINV included in the delay circuit 552 and the voltage control circuit 554 is optional. The delay circuit 552 and the voltage control circuit 554 can include, for example, the inverter circuits SINV of three or more stages.

(5) In the embodiment explained above, the opposite electrode 562 is illustrated that has the shape in which the plurality of electrode sections 565 are disposed between the first common wiring section 566A and the second common wiring section 566B. However, the shape of the opposite electrode 562 is not limited to the above illustration. For example, a configuration can also be suitably adopted in which the opposite electrode 562 is formed in a rectangular shape including the first connection point SP1 and the second connection point SP2 and continuous over the substantially entire region of the opposite substrate 560.

(6) In the embodiment explained above, the configuration is illustrated in which one first connection point SP1 is provided in the first common wiring section 566A. However, a plurality of first connection points SP1 may be provided in the first common wiring section 566A. For example, a configuration is also suitable in which two first connection points SP1 in total are provided at both end portions of the first common wiring section 566A. A position where the first connection point SP1 is provided in the first common wiring section 566A is not limited to an end portion of the first common wiring section 566A. For example, a configuration is also suitable in which the first connection point SP1 is provided in the center of the first common wiring section 566A. With the configuration in which the plurality of first connection points SP1 are provided in the first common wiring section 566A and the configuration in which the first connection point SP1 is provided in the center of the first common wiring section 566A, compared with the configuration in which the first connection point SP1 is provided only at one end portion of the first common wiring section 566A, a difference in a voltage between both the ends of the first common wiring section 566A (a voltage distribution due to a voltage drop in the longitudinal direction of the first common wiring section 566A) is suppressed. Therefore, there is an advantage that electric currents flowing to the plurality of electrode sections 565 are equalized.

Note that, in the above explanation, attention is directed to the first connection point SP1 of the first common wiring section 566A. However, the number and the position are also optional concerning the second connection point SP2 of the second common wiring section 566B. For example, a configuration can be adopted in which a plurality of second connection points SP2 are provided in the second common wiring section 566B. Further, a configuration can be adopted in which the second connection point SP2 is provided in the center of the second common wiring section 566B.

(7) In the embodiment explained above, in the fourth process of the manufacturing method for the display device 500, the electrophoretic element 46 is encapsulated after the element substrate 510 and the opposite substrate 560 are joined. However, the element substrate 510 and the opposite substrate 560 may be joined after the electrophoretic element 46 is disposed on the surface of the insulating layer SLC.

What is claimed is:
1. A display device substrate comprising:
a pixel electrode including a first connection point and a second connection point and for applying a voltage to an electro-optical element, a display gradation of which changes according to application of a voltage;
a first signal line;
a second signal line;
a first transistor configured to control connection of the first signal line and the first connection point;
a second transistor configured to control connection of the second signal line and the second connection point; and
an output section configured to supply a first driving signal to the first signal line and supply a second driving signal delayed with respect to the first driving signal to the second signal line, wherein
the output section includes a first inverter circuit that is electrically connected to the first signal line and a second inverter circuit that is electrically connected to the second signal line; and
the first inverter circuit includes a third transistor and the second inverter circuit includes a fourth transistor, a channel width of the fourth transistor being larger than a channel width of the third transistor.

2. The display device substrate according to claim 1, further comprising a scanning line connected to a gate of the first transistor and a gate of the second transistor, wherein
the first transistor and the second transistor are controlled to an ON state according to supply of a selection voltage to the scanning line.

3. The display device substrate according to claim 1, wherein
the output section includes a delay circuit that generates the second driving signal and outputs the second driving signal to the second signal line, and
the delay circuit includes a transistor having a characteristic that a drain current decreases as an environmental temperature is lower.

4. A display device comprising:
an electro-optical element, a display gradation of which changes according to application of a voltage;
a pixel electrode including a first connection point and a second connection point;
an opposite electrode configured to apply a voltage to the electro-optical element between the opposite electrode and the pixel electrode;
a first signal line;
a second signal line;
a first transistor configured to control connection of the first signal line and the first connection point;
a second transistor configured to control connection of the second signal line and the second connection point; and an output section configured to supply a first driving signal to the first signal line and supply a second driving signal delayed with respect to the first driving signal to the second signal line, wherein the output section includes a first inverter circuit that is electrically connected to the first signal line and a second inverter circuit that is electrically connected to the second signal line; and the first inverter circuit includes a third transistor and the second inverter circuit includes a fourth transistor, a channel width of the fourth transistor being larger than a channel width of the third transistor.

5. An electronic apparatus comprising the display device according to claim 4.

6. A control method for a display device including a pixel electrode including a first connection point and a second connection point and for applying a voltage to an electro-optical element, a display gradation of which changes according to application of a voltage, a first signal line, a second signal line, a first transistor configured to control connection of the first signal line and the first connection point, and a second transistor configured to control connection of the second signal line and the second connection point, the control method for the display device comprising supplying, from an output section, a first driving signal to the first signal line and supplying, from the output section, a second driving signal delayed with respect to the first driving signal to the second signal line in a state in which the first transistor and the second transistor are turned on, wherein the output section includes a first inverter circuit that is electrically connected to the first signal line and a second inverter circuit that is electrically connected to the second signal line; and the first inverter circuit includes a third transistor and the second inverter circuit includes a fourth transistor, a channel width of the fourth transistor being larger than a channel width of the third transistor.

* * * * *